(12) United States Patent
Alexandridis et al.

(10) Patent No.: US 12,586,565 B1
(45) Date of Patent: Mar. 24, 2026

(54) CONTEXT-BASED AUTOMATIC SPEECH RECOGNITION PROCESSING

(71) Applicant: Amazon Technologies, Inc., Seattle, WA (US)

(72) Inventors: Anastasios Alexandridis, Pittsburgh, PA (US); Kanthashree Mysore Sathyendra, Sunnyvale, CA (US); Grant Strimel, Presto, PA (US); Feng-Ju Chang, Pittsburgh, PA (US); Ariya Rastrow, Seattle, WA (US); Nathan Anthony Susanj, York, PA (US); Athanasios Mouchtaris, Pittsburgh, PA (US)

(73) Assignee: Amazon Technologies, Inc., Seattle, WA (US)

( * ) Notice: Subject to any disclaimer, the term of this patent is extended or adjusted under 35 U.S.C. 154(b) by 269 days.

(21) Appl. No.: 18/128,097

(22) Filed: Mar. 29, 2023

Related U.S. Application Data

(60) Provisional application No. 63/444,418, filed on Feb. 9, 2023.

(51) Int. Cl.
G10L 15/06 (2013.01)
G10L 15/16 (2006.01)

(52) U.S. Cl.
CPC ............ G10L 15/063 (2013.01); G10L 15/16 (2013.01)

(58) Field of Classification Search
CPC ........ G10L 15/063; G10L 15/16; G10L 15/00
See application file for complete search history.

(56) References Cited

U.S. PATENT DOCUMENTS

| | | | | |
|---|---|---|---|---|
| 9,940,930 | B1 * | 4/2018 | Campbell | G10L 15/22 |
| 10,990,899 | B2 * | 4/2021 | Le | G06N 5/01 |
| 11,574,126 | B2 * | 2/2023 | McGoldrick | G06F 40/216 |
| 2012/0158989 | A1 * | 6/2012 | Patil | G06Q 30/02 |
| | | | | 709/235 |
| 2016/0217790 | A1 * | 7/2016 | Sharifi | G10L 15/01 |
| 2020/0020327 | A1 * | 1/2020 | Chae | G06F 40/268 |
| 2021/0081717 | A1 * | 3/2021 | Creed | G06N 5/02 |
| 2021/0383070 | A1 * | 12/2021 | Hunter | G06N 20/00 |
| 2022/0157307 | A1 * | 5/2022 | Hartung | G10L 15/22 |

(Continued)

OTHER PUBLICATIONS

Chiu, et al., "State-of-the-art speech recognition with sequence-to-sequence models," IEEE International Conference on Acoustics, Speech and Signal Processing (ICASSP), 2018, pp. 4774-4778.

(Continued)

*Primary Examiner* — Michael Colucci
(74) *Attorney, Agent, or Firm* — Pierce Atwood LLP

(57) ABSTRACT

Techniques for biasing for entities during automatic speech recognition (ASR) processing are described. In some embodiments, a system implements a gating component that is configured to switch on and off entity biasing on an audio frame basis when processing a spoken input. The gating component processes an audio frame to determine whether the audio frame likely includes a representation of a custom entity. Based on the determination, a biasing component, which is configured to generate entity embeddings, may be turned on or off. In this manner, entity biasing does not run on every audio frame, but only on the audio frames where it can be helpful in increasing ASR accuracy.

16 Claims, 8 Drawing Sheets

(56) References Cited

U.S. PATENT DOCUMENTS

| | | | | |
|---|---|---|---|---|
| 2023/0244926 A1* | 8/2023 | Kim | | G06N 3/045 |
| | | | | 706/21 |
| 2023/0282018 A1* | 9/2023 | Basu | | G06N 20/00 |
| | | | | 382/181 |
| 2023/0360643 A1* | 11/2023 | Mittal | | G06N 3/0464 |

OTHER PUBLICATIONS

Graves, "Sequence transduction with recurrent neural networks", International Conference on Machine Learning (ICML), 2012.

Dong, et al., "Speech-transformer: A no-recurrence sequence-to-sequence model for speech recognition," IEEE International Conference on Acoustics, Speech and Signal Processing (ICASSP), 2018, pp. 5884-5888.

Gulati, et al., "Conformer: Convolution-augmented transformer for speech recognition," 2020.

Li, et al. "A better and faster end-to-end model for streaming ASR," IEEE International Conference on Acoustics, Speech and Signal Processing (ICASSP), 2021, pp. 5634-5638.

Bruguier, et al., "Learning personalized pronunciations for contact names recognition," 2016.

Pundak, et al., "Deep context: end-to-end contextual speech recognition," IEEE Spoken Language Technology Workshop (SLT), 2018, pp. 418-425.

Bruguier, et al., "Phoebe: Pronunciation-aware contextualization for end-to-end speech recognition," IEEE International Conference on Acoustics, Speech and Signal Processing (ICASSP), 2019, pp. 6171-6175.

Gourav, et al., "Personalization strategies for end-to-end speech recognition systems," IEEE International Conference on Acoustics, Speech and Signal Processing (ICASSP). IEEE, 2021, pp. 7348-7352.

Jain, et al., "Contextual rnn-t for open domain ASR," arXiv preprint arXiv:2006.03411, 2020.

Le, et al., "Deep shallow fusion for RNN-T personalization," in 2021 IEEE Spoken Language Technology Workshop (SLT). IEEE, 2021, pp. 251-257.

Le, et al., "Contextualized streaming end-to-end speech recognition with trie-based deep biasing and shallow fusion," arXiv preprint arXiv:2104.02194, 2021.

Zhao, et al., "Shallow-Fusion End-to-End Contextual Biasing," Proc. Interspeech, 2019, pp. 1418-1422.

Yanzhang, et al., "Streaming end-to-end speech recognition for mobile devices," IEEE International Conference on Acoustics, Speech and Signal Processing (ICASSP). IEEE, 2019, pp. 6381-6385.

Chen, et al., "Joint grapheme and phoneme embeddings for contextual end-to-end ASR.," Proc. Interspeech, 2019, pp. 3490-3494.

Chang, et al., "Context-aware transformer transducer for speech recognition," ASRU, 2021.

Sathyendra, et al., "Contextual adapters for personalized speech recognition in neural transducers," IEEE International Conference on Acoustics, Speech and Signal Processing (ICASSP), 2022, pp. 8537-8541.

Macoskey, et al., "Bifocal neural ASR: Exploiting keyword spotting for inference optimization," IEEE International Conference on Acoustics, Speech, and Signal Processing (ICASSP), 2021.

Macoskey, et al., "Amortized neural networks for low-latency speech recognition," Interspeech, 2021.

Shi, et al., "Dynamic encoder transducer: A flexible solution for trading off accuracy for latency," Interspeech, 2021, pp. 2042-2046.

Sennrich, et al., "Neural machine translation of rare words with subword units," ACL, 2016.

Vaswani, et al., "Attention is all you need," NeurNIPS, 2017.

\* cited by examiner

FIG. 3

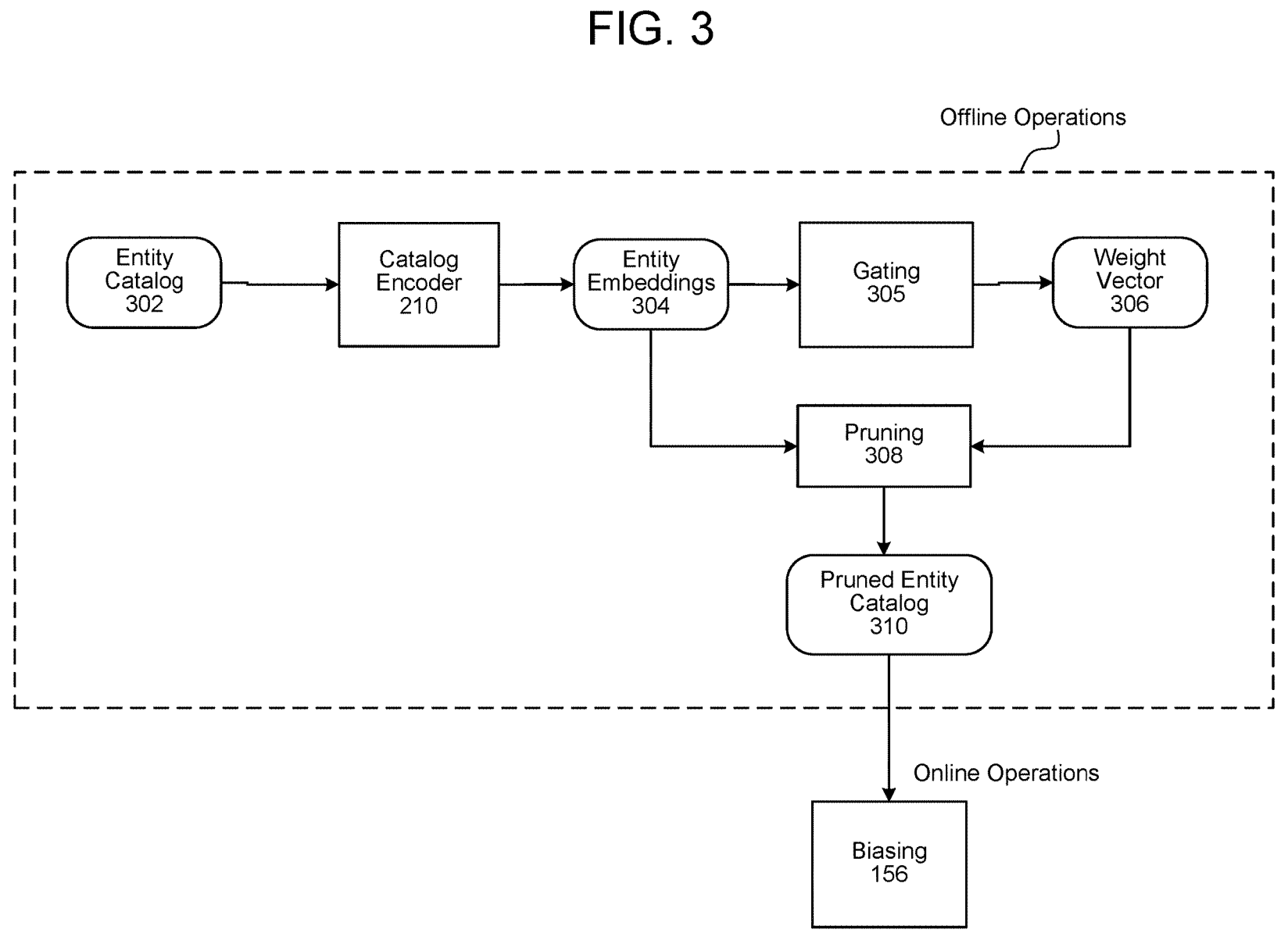

Offline Operations

Online Operations

Entity Catalog 302 → Catalog Encoder 210 → Entity Embeddings 304 → Gating 305 → Weight Vector 306

Gating 305 → Pruning 308

Entity Embeddings 304 → Pruning 308

Weight Vector 306 → Pruning 308

Pruning 308 → Pruned Entity Catalog 310 → Biasing 156

FIG. 6

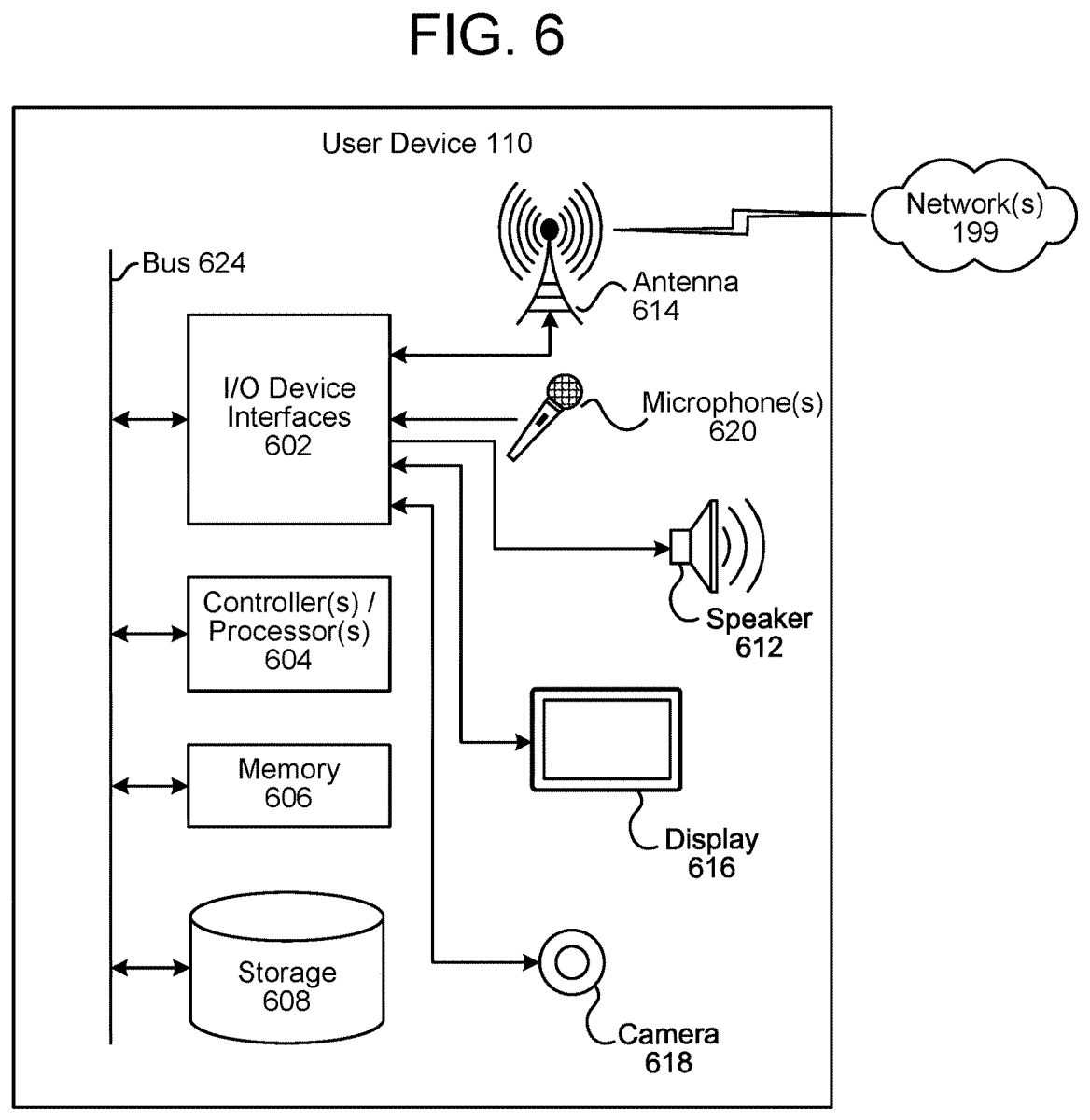

User Device 110

Network(s) 199

Antenna 614

Microphone(s) 620

Speaker 612

Display 616

Camera 618

Bus 624

I/O Device Interfaces 602

Controller(s) / Processor(s) 604

Memory 606

Storage 608

FIG. 7

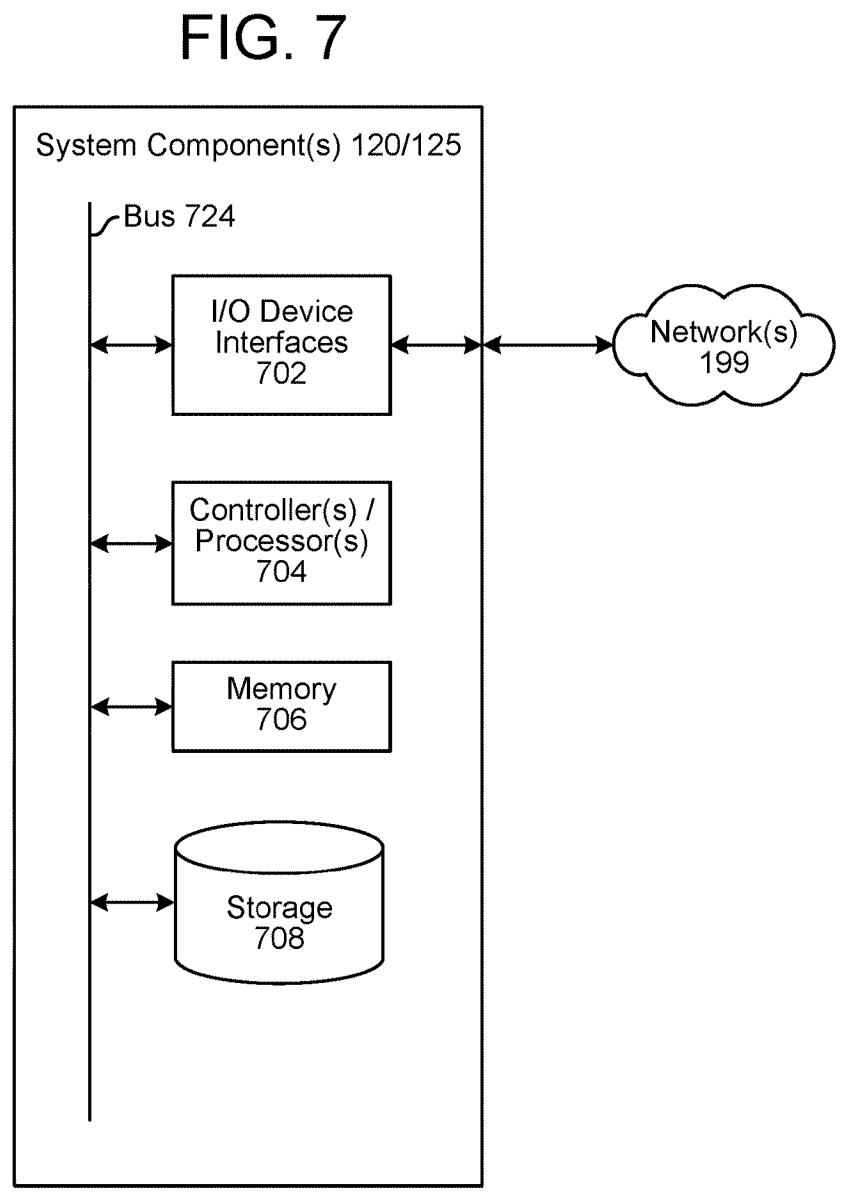

System Component(s) 120/125

Bus 724

I/O Device Interfaces 702

Controller(s) / Processor(s) 704

Memory 706

Storage 708

Network(s) 199

FIG. 8

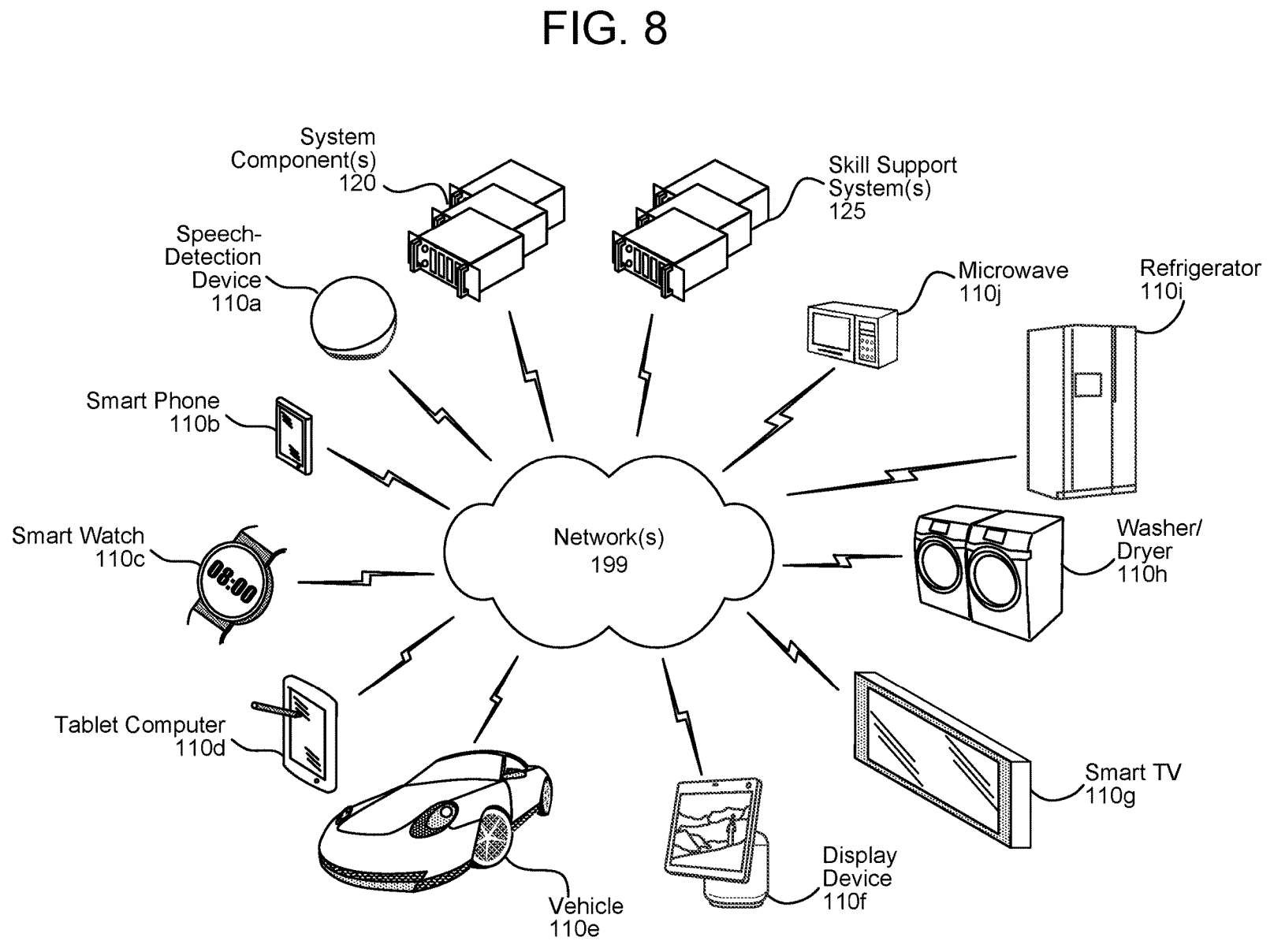

Refrigerator 110i

Washer/ Dryer 110h

Smart TV 110g

Display Device 110f

Vehicle 110e

Tablet Computer 110d

Smart Watch 110c

Smart Phone 110b

Speech-Detection Device 110a

System Component(s) 120

Skill Support System(s) 125

Microwave 110j

Network(s) 199

CONTEXT-BASED AUTOMATIC SPEECH RECOGNITION PROCESSING

CROSS-REFERENCE TO RELATED APPLICATION

This application claims the benefit of priority under 35 U.S.C. § 119(e) of U.S. Provisional Patent Application No. 63/444,418, filed Feb. 9, 2023, and entitled "AUTOMATIC SPEECH RECOGNITION", the entire contents of which is incorporated herein by reference for all purposes.

BACKGROUND

Spoken language understanding systems have progressed to the point where humans can interact with computing devices using their voices. Such systems employ techniques to identify the words spoken by a human user based on the various qualities of a received audio input. Speech recognition combined with natural language understanding techniques enable speech-based user control of a computing device to perform tasks based on the user's spoken commands. The combination of speech recognition and natural language understanding processing techniques is referred to herein as spoken language understanding.

Spoken language understanding may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 3 is a conceptual diagram showing how an entity catalog may be pruned, according to embodiments of the present disclosure.

FIG. 6 is a block diagram conceptually illustrating example components of a device according to embodiments of the present disclosure.

FIG. 7 is a block diagram conceptually illustrating example components of a system according to embodiments of the present disclosure.

FIG. 8 illustrates an example of a computer network for use with the speech processing system.

DETAILED DESCRIPTION

Figure 1:
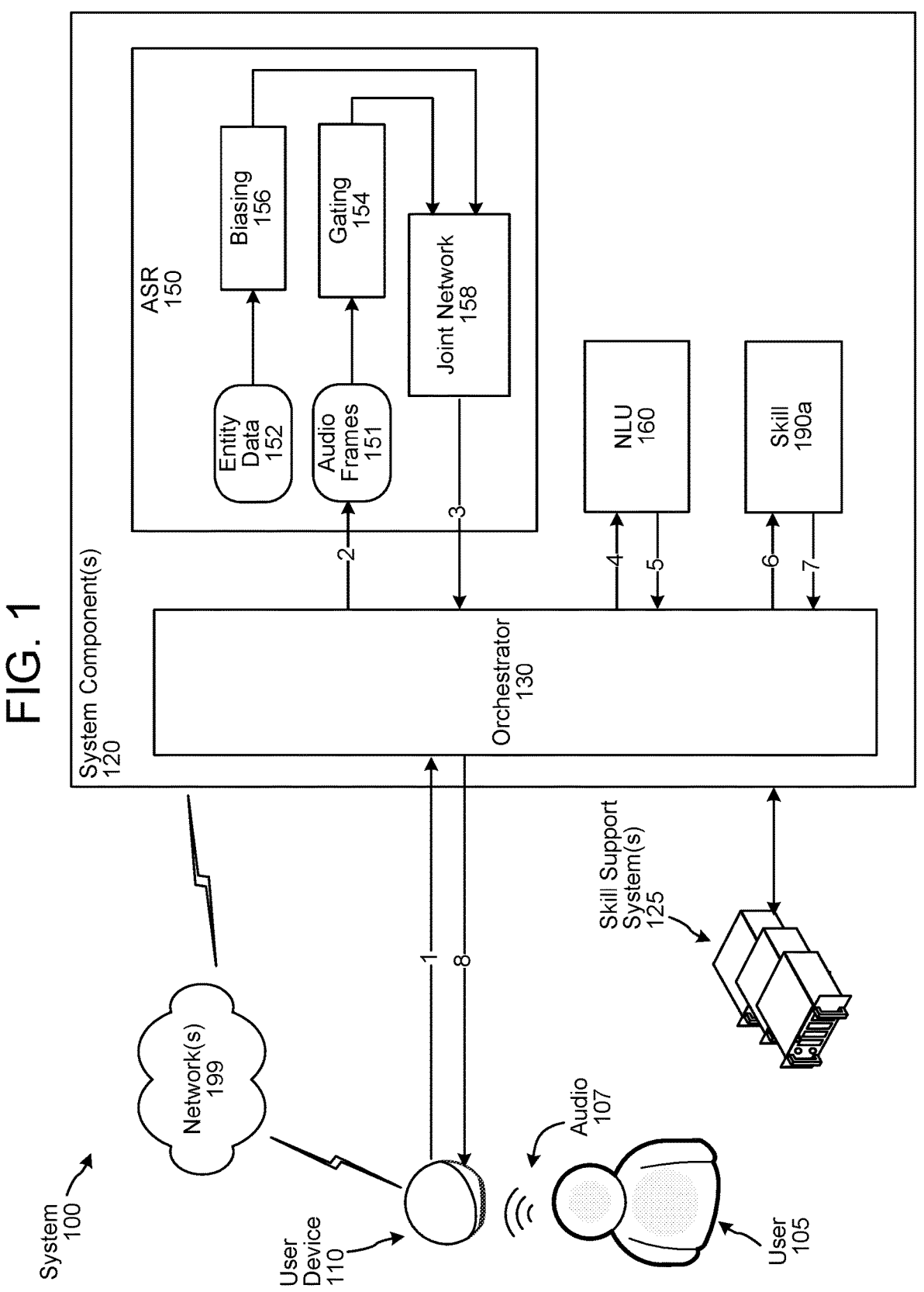
FIG. 1 illustrates a system for processing a spoken user input using automatic speech recognition (ASR) processing with selective entity biasing, according to embodiments of the present disclosure.

Automatic speech recognition (ASR) is a field of computer science, artificial intelligence, and linguistics concerned with transforming audio data associated with speech into words (as represented by, e.g., machine/human-readable text, machine-understandable tokens, etc.) representative of that speech. Natural language understanding (NLU) is a field of computer science, artificial intelligence, and linguistics concerned with enabling machines to derive meaning from input containing natural language. Natural language generation (NLG) is a field of artificial intelligence concerned with automatically transforming data into natural language (e.g., English) content. Text-to-speech (TTS) is a field concerning transforming data into audio data that is synthesized to resemble human speech. ASR, NLU, NLG, and TTS may be used together as part of a speech-processing system.

Certain systems may be configured to perform actions responsive to user inputs. For example, for the user input of "Alexa, play music by [artist]," a system may output music sung by the indicated artist. For further example, for the user input of "Alexa, what is the weather in [city]," a system may output synthesized speech representing weather information for the indicated city. In a further example, for the user input of "Alexa, send a message to [recipient]," a system may capture spoken message content and cause the same to be output via a device of the indicated recipient. In the foregoing examples, the actions correspond to outputting music, outputting synthesized speech, and causing spoken message content to be output.

Certain systems can use neural network models for ASR processing. Examples of such models include recurrent neural network transducer (RNN-T), transformer, and conformer-transducer. To facilitate recognition of custom entities (i.e., entities unique to a user's input, such as contact names from the user's contact list, song names from the user's music catalog, user-defined device names, etc.) that may be uncommon and may appear rarely in the training data for ASR models, certain systems may use a biasing mechanism to cause the ASR model to apply attention to the custom words while transcribing speech.

Certain systems may run the biasing mechanism on every audio frame of input audio data. This can increase the computational complexity and latency of the overall system. Moreover, a large of number of custom entities can exacerbate the issue by requiring the biasing mechanism to apply attention over all the custom entities.

The present disclosure includes description of machine-implemented techniques for applying a biasing mechanism to certain audio frames of input audio data instead of every audio frame. A system of the present disclosure may involve using a gating component that is configured to determine which audio frames can benefit from entity biasing for more accurate ASR processing. The gating component may "switch on" (i.e., initiate processing by) or "switch off" (i.e., cease processing by) the biasing mechanism on an audio frame basis. By not running the biasing mechanism on every audio frame, the system uses less computational resources and reduces latency.

The techniques of the present disclosure may be used with a neural network-based ASR component that may include a joint network configured to combine information from prior predicted tokens of prior audio frames of the input audio data. The ASR component may further include a prediction network that is configured to encode the prior predicted tokens. In some embodiments, the gating component may be trained using the confidence scores of the ASR component such that the gating component may generate a smaller gate value for an audio frame that the ASR component is able to transcribe with a high confidence score and may generate a larger gate value for an audio frame that the ASR component is not able to transcribe with a certain level of confidence. The larger gate value may thus indicate that entity biasing is useful for more accurate ASR processing of the audio frame. Based on the gate value corresponding to the audio frame, the biasing mechanism may be turned on or off.

Techniques of the present disclosure may provide some advantages over other systems. For example, the system of the present disclosure may reduce latency in ASR processing. As a further example, the system may improve accuracy with respect to recognizing custom entities. In at least some cases, a system configured as described herein results in accuracy improvements in ASR processing using entity biasing, while providing compute-cost savings as entity biasing is executed only on some of the input audio frames (e.g., 15% of the input audio frames) rather than executing entity biasing on all the input audio frames.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system for processing a spoken user input using speech recognition processing with selective entity biasing, according to embodiments of the present disclosure. As shown in FIG. 1, the system 100 may include a user device 110, local to a user 105, and a system component(s) 120 connected, to the user device 110, across one or more networks 199. The network(s) 199 may include the Internet and/or any other wide or local area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The system component(s) 120 may include one or more speech processing components configured to process spoken natural language inputs using ASR and NLU processing. The system component(s) 120 may also be configured to process non-spoken inputs, such as gestures, textual inputs, selection of GUI elements, selection of device buttons, etc. The system component(s) 120 may include multiple components to facilitate user input processing, some of which are described below in relation to FIG. 4.

As shown in FIG. 1, the system component(s) 120 may include an orchestrator component 130, an ASR component 150, a NLU component 160 and a skill component 190a. The system component(s) 120 may be in direct, wired or wireless communication, over the network(s) 199, with one another. The orchestrator component 130 may be configured to route data to the appropriate components of the system component(s) 120 to facilitate processing of and response to a user input. However, the present disclosure is not intended to be limited to such a configuration. In some embodiments, the user device 110 may include or otherwise be configured to perform the herein disclosed processing of one or more of the orchestrator component 130, the ASR component 150, the NLU component 160, and the skill component 190a.

The user 105 may speak an input, and the user device 110 may capture audio 107 representing the spoken input. The user device 110 may send (step 1) audio data (e.g., audio data 411/511 illustrated in FIGS. 4/5, respectively) to the system component(s) 120 for processing. In some embodiments, the user device 110 may send the audio data 411/511 after the user 105 has finished speaking. In other embodiments, the user device 110 may send the audio data 411/511 in a streaming fashion until an endpoint of speech in the audio 107 is determined.

The orchestrator component 130 may send (step 2) the audio data 411/511 to the ASR component 150 for processing. The ASR component 150 may process the audio data 411/511 to determine ASR data (e.g., token data, text data, ASR hypotheses including token or text data and corresponding confidence scores, etc.) representing the words spoken by the user 105.

Audio frames 151 may be determined from the audio data 411/511. The audio frames 151 may correspond to a portion or all of the audio data 411/511. The ASR component 150 may process a set of audio frames 151 that includes multiple individual audio frames. In example embodiments, an audio frame may be 32 ms of the audio data 411/511.

As shown in FIG. 1, the ASR component 150 may include a gating component 154, a biasing component 156 and a joint network 158. The gating component 154 may be configured to determine whether entity biasing, by the biasing component 156, is to be applied when processing an instant audio frame, or set of frames (e.g., the audio frames 151). The biasing component 156 may be configured to generate representations of entities (e.g., biasing data 216) that can be used to bias ASR processing with respect to the audio frames 151. The joint network 158 may be configured to predict a token(s) corresponding to the audio frames 151. In some cases, the joint network 158 may process first audio frames 151a (of the audio data 411/511) with entity biasing information, while processing second audio frames 151b (of the audio data 411/511) without entity biasing information.

The gating component 154 may effectively switch the biasing component 156 on or off based on whether entity biasing information is helpful or not helpful for ASR processing with respect to an audio frame, or set of audio frames (e.g., the audio frames 151). In switching the biasing component 156 off for one or more particular audio frames, the ASR component 150 can reduce the amount of computational resources used in processing a spoken input and reduce ASR latency. The gating component 154 may generate a gating value representing a likelihood of an audio frame including a custom entity.

Figure 2:
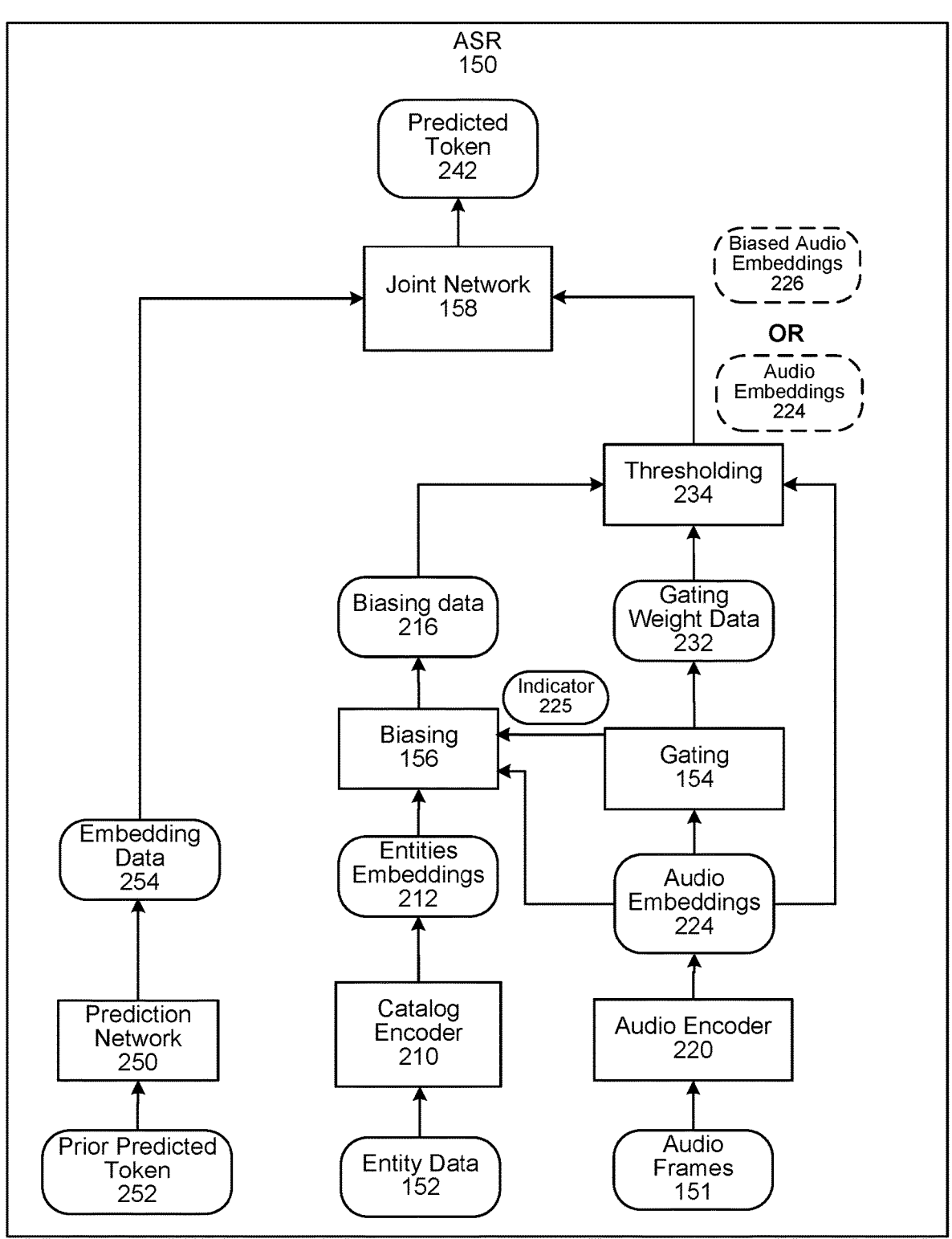
FIG. 2 is a conceptual diagram of an ASR component, according to embodiments of the present disclosure.

FIG. 2 illustrates further details of an example embodiment of the ASR component 150 implementing the gating component 154 and the biasing component 156. In addition to the components shown in FIG. 1, the ASR component 150 may include an audio encoder 220, a catalog encoder 210, a prediction network 250 and a thresholding component 234. The ASR component 150, in some embodiments, processes audio data 411/511 as it is received (e.g., in a streaming manner); that is the ASR component 150 processes audio frames sequentially in the order they are received.

The example shown in FIG. 2 is a neural transducer end-to-end ASR model. Other embodiments may implement other types of models that may employ techniques similar to the gating component 154 described herein.

The audio encoder 220 may receive and process the audio frames 151 for time duration T. The audio frames 151 may be represented as vector $x_t=(x_0, \ldots x_t)$ for equations. The audio encoder 220 may generate audio embeddings 224, which may be high-dimensional representations of an individual set of audio frames 151 and may be denoted herein as $$h_t^{enc}$$

in equations.

The prediction network 250 may receive and process prior predicted token(s) 252 corresponding to a prior set of audio frames processed in a prior iteration of processing of the instant user input by the ASR component 150. In the instance where the audio frames 151 are the first audio frames being processed for the instant user input, it will be appreciated that there will be no prior predicted token(s) 252 for input to the prediction network 250. The prior predicted token 252 may be represented as vector $y_{u-1}=(y_0, \ldots y_{u-1})$. The prediction network 250 may generate embedding data 254, which may be denoted herein as $$h_u^{pred}.$$

The joint network 158 may combine the audio embeddings $$224(h_t^{enc})$$

and the embedding data $$254(h_u^{pred})$$

via a joint operation and may pass the output through a series of feedforward layers with activations and a final softmax to generate a probability distribution over word-pieces. The probability distribution may result in a top scoring predicted token 242.

In some embodiments, the audio encoder 220, the prediction network 250 and/or the joint network 158 may be stacked RNN layers, transformer blocks or conformer blocks.

The neural transducer model, including the audio encoder 220, the prediction network 250 and the joint network 158 may be trained with the RNN-T loss using a forward-backward algorithm.

The ASR component 150 may also include contextual entity adapters to augment the neural transducer model, where the adapters include a catalog encoder 210 and the biasing component 156. The catalog encoder 210 may receive and process entity data 152, which may be text data, tokenized data or other word representation data representing a catalog of entities. The catalog of entities may be custom entities associated with the user profile of the user 105, the device profile of the user device 110, and/or a group profile to which the user 105 and/or the user device 110 belong (i.e., with which the user profile and/or the device profile are associated). The ASR component 150 may receive the entity data 152 from the orchestrator component 130 or another system component. In some embodiments, the entity data 152 may correspond to user-defined device names (e.g., bedroom lights, living room TV, John's speaker, etc.), contact names from contact list, user-defined names for things like media playlist, shopping list, wish list, task list, calendar entry, routine, etc.

The catalog encoder 210 may be configured to generate entities embeddings 212, which may be encoded representations of the entities included in the entity data 152. In some embodiments, the catalog encoder 210 may tokenize the individual entities into word-pieces and may pass them through an embedding lookup and a series of BiLSTM layers. For K entities, the entity data 152 may be represented as vector $C=[c_1, c_2, \ldots c_K]$, and the entities embeddings 212 may be denoted herein as $C_e=[c_{e1}, c_{e2}, \ldots c_{eK}]$.

In some embodiments, an entity may be associated with a special no-bias token to avoid biasing for that entity.

The biasing component 156 may be configured to adapt the neural transducer's intermediate representations based on entity embeddings. In some embodiments, the biasing component 156 may employ a cross-attention mechanism to attend over the entities embeddings 212 ($C_e$) based on an input query representation—this case the audio embeddings $$224(h_t^{enc}).$$

The biasing component 156 may generate biasing data 216, which may be a vector of attention weights, where an individual attention weight corresponds to an individual entity of the entity data 152. The biasing data 216 may be represented as $\alpha=(\alpha_1, \ldots \alpha_i)$ for i entities. In some embodiments, the biasing component 156 may compute the attention weight using a scaled dot-product attention technique.

In some embodiments, the biasing component 156 may apply attention to the audio embeddings 224. In other embodiments, the biasing component 156 may apply attention to any intermediate representation, such as the state(s) of the joint network 158 or the state(s) of the prediction network 250. In such other embodiments, the biasing component 156 may receive, as input, a state output of the joint network 158 and/or the prediction network 250.

The gating component 154 is configured to determine whether contextual entity biasing is needed for performing ASR processing of an audio frame. At inference (i.e., during runtime), the gating component 154 switches entity biasing on or off. In some embodiments, the gating component 154 may send an indicator 225 (e.g., a signal, a flag, a particular value, etc.) to the biasing component 156 in response to which the biasing component 156 may initiate processing. For example, if the gating component 154 determines that entity biasing is needed for the audio frames 151, then the gating component 154 may send an indicator 225 thereof to the biasing component 156, in response to which the biasing component 156 may process the entities embeddings 212 and generate the biasing data 216. As a further example, if the gating component 154 determines that entity biasing is not needed for an audio frame, then the gating component 154 may not send any indicator to the biasing component 156, and thus, the biasing component 156 may not initiate processing (i.e. may not generate the biasing data 216). The gating component 154 may process a set of audio frames 151 and determine a gating weight/value corresponding to an individual audio frame of the set. The gating weights for the set of audio frames 151 may be included in gating weight data 232. The gating weight for an audio frame may be indicative of whether entity biasing is helpful in performing ASR for the audio frame. In other words, the gating weight may be indicative of whether the audio frame includes a representation of a custom entity.

In some embodiments, the gating component 154 may be configured to generate gating weights based on the ASR model's confidence in processing an audio frame. The gating component 154 may determine a first weight value for a first audio frame of the audio data 411/511 based on determining that the ASR model is likely to generate a high confidence score when processing the first audio frame (i.e., the ASR model is likely confident in transcribing the first audio frame). The gating component 154 may determine a second weight value for a second audio frame of the audio data 411/511 based on determining that the ASR model is likely to generate a low confidence score when processing the second audio frame (i.e., the ASR model is likely to be non-confident in transcribing the second audio frame). In this case, the first weight value may be lower than (or higher than depending on system configuration) the second weight value, where a higher/second weight value causes entity biasing to be applied to the (second) audio frame.

The gating component 154 may implement a lightweight model, one that processes an audio frame quicker than the biasing component's 156 model. In other embodiments, the biasing component 156 may initiate processing in parallel to or at the same time as the gating component 154 is processing, and in response to receiving the indicator 225 from the gating component 154, the biasing component 156 may cease processing or may continue processing. For example, if the gating component 154 determines that entity biasing is needed for the audio frames 151, then the gating component 154 may send an indicator 225 thereof to the biasing component 156, in response to which the biasing component 156 may continue processing of the entities embeddings 212 and generate the biasing data 216. As a further example, if the gating component 154 determines that entity biasing is not needed for the audio frames 151, then the gating component 154 may send an indicator 225 thereof to the biasing component 156, in response to which the biasing component 156 may cease processing of the entities embeddings 212 (i.e. not generate the biasing data 216). In still another example, as the biasing component 156 may be configured to process in parallel to the gating component 154, in the situation where the gating component 154 determines that entity biasing is needed, the gating component 154 may not send an indicator thereof to the biasing component 156, resulting in the biasing component 156 continuing its processing for the instant audio frame.

In yet other embodiments, the ASR component 150 may use the thresholding component 234 to determine when to use the biasing data 216. The gating component 154 may generate the gating weight data 232, which may be a numerical value (e.g., a gating score), as described herein. The thresholding component 234 may process the gating weight data 232 with respect to a condition. For example, the thresholding component 234 may compare the gating weight data 232 to a threshold value. If the gating weight data 232 satisfies the condition (e.g., the gating weight data 232 is below the threshold value), then the thresholding component 234 determines that biasing information is not needed to process the audio frames 151. In such cases, the joint network 158 processes the audio embeddings 224; that is, the thresholding component 234 (or another component) provides the audio embeddings 224 to the joint network 158 for processing. If the gating weight data 232 does not satisfy the condition (e.g., the gating weight data 232 is above the threshold value), then the thresholding component 234 determines that biasing information is helpful to process the audio frames 151. In such cases, the joint network 158 processes biased audio embeddings 226; that is, the thresholding component 234 (or another component) provides the biased audio embeddings 226 to the joint network 158 for processing. In other embodiments, the thresholding component 234 may determine biasing information is helpful when the gating weight data 232 satisfies the condition, and may determine biasing information is not needed when the gating weight data 232 does not satisfy the condition.

Based on the attention scores determined by the biasing component 156, the weighted sum of the value embeddings (obtained by a linear projection W, of the entity embeddings) may be computed as $$b_t = \sum_i^K \alpha_i W_v c_i^e.$$

The biasing vector $b_t$ may be included in the biasing data 216 and may be used to update the intermediate representations of the neural transducer ASR model (e.g., the audio embeddings 224). This may be done by linearly projecting the biasing vector $b_t$ to the dimensions of the intermediate representation $$h_t^{enc}$$

and adding it to the intermediate representation, resulting in the updated representation $$\hat{h}_t^{enc}.$$

The updated representation $$\hat{h}_t^{enc}$$

may be included in the biased audio embeddings 226.

The gating component 154 may be lightweight machine learning model. In some embodiments, the gating component 154 may be trained using certain pretrained components—the catalog encoder 210, the joint network 158 and the prediction network 250. That is, the catalog encoder 210, the joint network 158 and the prediction network 250 may be trained first to perform ASR processing using neural biasing, where neural biasing may be applied to each audio frame of input audio data 411/511. After the foregoing components are trained, the gating component 154 may be trained.

The gating component 154 may process the audio embeddings $$224(h_t^{enc}),$$

in some embodiments, by applying a feed-forward layer and a tanh activation layer. The resulting output may be projected to a scalar using another feed-forward layer, and then a sigmoid activation may be applied to get a weight, $\omega_t \in [0, 1]$:

$$z_t = \tanh(W_1 h_t^{enc} + b_1) \qquad \text{Equation (1)}$$

$$\omega_t = \text{sigmoid}(W_2 z_t + b_2) \qquad \text{Equation (2)}$$

Here, $W_1$, $W_2$, $b_1$, and $b_2$ are learnable weight matrices and bias vectors, respectively. The gating component 154 may produce a scalar weight $\omega_t$ (included in the gating weight data 232) for every audio frame 151. The gating weight data 232 may indicate how big the contribution of the bias vector has to be in the neural transducer intermediate state.

During training, the output weight $\omega_t$ of the gating component 154 may be multiplied by the bias vector $b_t$ and the intermediate encoder representation may be updated via an elementwise additions as:

$$\hat{h}_t^{enc} = h_t^{enc} + \omega_t * b_t \qquad \text{Equation (3)}$$

In this way the gating component 154 can scale (or gate) the contribution of the contextual biasing adapter to the intermediate neural representation.

The gated contextual biasing may be built by auxiliary training of the gating component 154. The neural transducer (i.e., the joint network 158 and the prediction network 250) and the contextual biasing (i.e., the catalog encoder 210 and the biasing component 156) may be initialized by a pretrained contextual neural transducer. The pretrained parameters may be kept frozen, while the gating component 154 is initialized randomly and trained from scratch. Since the gating component 154 interacts with the biasing component 156 only with element-wise multiplications, in some embodiments, the pretrained contextual ASR model architecture can remain the same. The gating component 154 may only be trained for a small number of epochs.

In some embodiments, the ASR component 150 shown in FIG. 2 (i.e., a gated contextual biasing architecture) is trained by enhancing the RNN-T loss with a regularization term. The goal being to teach the model that when contextual biasing is not needed, the weights output by the gating component 154 must be small. In one embodiment, equation 4 below may be used for the loss function:

$$\mathcal{L} = \mathcal{L}_{RNN-T} + \frac{\lambda}{T}\sum_{i=1}^{T}\omega_i \qquad \text{Equation (4)}$$

In another embodiment, equation 5 may be used for the loss function:

$$\mathcal{L} = \mathcal{L}_{RNN-T} + \frac{\lambda}{T}\sum_{i=1}^{T}\omega_i^2 \qquad \text{Equation (5)}$$

Equation 4 performs l1-regularization to the weights of the gating component, while Equation 5 performs an l2-regularization. The loss penalizes high weight values and incentivizes the gating component 154 to deactivate the biasing component 156 more often. The hyperparameter $\lambda$ controls how aggressively the model prioritizes on outputting small weights over maintaining the accuracy of contextual biasing.

During inference, the gating weight data 232 may act as a gate to toggle the biasing component 156 on and off. In some embodiments, a thresholding operation is applied, by the thresholding component 234, to the gating weight data 232 and the neural transducer intermediate state may be updated as follows:

$$\hat{h}_t^{enc}\begin{cases} h_t^{enc}, & \text{if } \omega_t \le \varepsilon \\ h_t^{enc} + b_t, & \text{otherwise}\end{cases} \qquad \text{Equation (6)}$$

Equation 6 is an example thresholding rule, which implies that when the gating weight data 232 is less than a predefined threshold $\varepsilon$, the biasing component 156 can be switched off. Since the biasing component 156 is based on an attention mechanism in which the keys (i.e., entity embeddings 212) can be of a large dimension, switching of the biasing component 156 can save compute cost and latency.

In example embodiments, the audio frame 151 may include audio features determined as follows. First a 64-dimensional Log-filter bank energies (LFBEs) may be extracted by segmenting input audio data with a window of 32 ms and frame rate of 10 ms. Then a left context of 3 frames may be used, resulting in 192-dimensional input feature vectors, with a skip rate of 3 frames. In some embodiments, the features are normalized with global mean and variance.

In example embodiments, the ASR component 150 may employ a conformer-T model. The conformer-based encoder network may consist of two convolutional layers followed by 14 conformer blocks. The convolutional layers may have 128 kernels of size=3 and strides=2 and 1 for the first and second convolutional layer, respectively. Each conformer block may contain a feed-forward network module with 1024 units, a convolutional module with kernel size 15 and an attention module with eight 64-dimensional attention heads. All convolutions and attentions may be computed on the current and previous audio frames to make the model streamable.

In example embodiments, the prediction network 250 may consist of 2 LSTM layers with 1024 units. The output of the encoder and decoder may be projected to 512 units. The joint network 158 may consist of a feed-forward layer of 512 units. A 4 k word-piece tokenizer may be used to create the output tokens. During decoding the standard conformer-T beam search may be performed with a beam size set to 8. The total parameters of the model may be 81 M. For training, the Adam optimizer may be used with varied learning rate.

In example embodiments, the catalog encoder 210 may be a Bi-directional LSTM with 128 units with an input size of 64. The final output may be projected to a 64-dimensional representation. The biasing component 156 may project the query, key, and values into 128 dimensions and the final biasing vector may be projected to the same output as the audio encoder 220 intermediate representation using a linear projection.

In an example embodiment, the gating component 154 may be a feed-forward layer with 128 units. The output of which may be consumed by a second feed-forward layer that outputs the weight $\omega_t$. The gating component 154 may comprise of only 65K parameters, which may be less than 0.1% of the total parameters of the neural transducer model and less than 12% of the contextual biasing adapter.

Using the output of the joint network 158, as described above, the ASR component 150 may determine ASR data corresponding to the spoken input from the user 105.

Referring to FIG. 1, the joint network 158 may send (step 3) the ASR data to the orchestrator component 130. The ASR data may include one or more ASR hypotheses corresponding to words spoken by the user 105, where an ASR hypothesis may include text data, token data or other word representation data, and a corresponding ASR confidence score.

The orchestrator component 130 may send (step 4) the ASR data to the NLU component 160. The NLU component 160 may attempt to make a semantic interpretation of the word(s) or statement(s) represented in the spoken input by determining one or more meanings associated with the word(s) or statement(s) indicated in the phoneme data and the ASR data. The NLU component 160 may determine an intent representing an action that a user desires be performed and may determine information that allows a system component and/or device to execute the intent. The NLU component 160 may determine NLU data including one or more NLU hypotheses, where individual NLU hypotheses may include a corresponding domain indicator, intent indicator, entity data (e.g., entity types, entity values), skill indicator, and/or NLU confidence score. The NLU component 160 may send (step 5) the NLU data to the orchestrator component 130.

The orchestrator component 130 may send (step 6) the NLU data to the skill component 190*a*. As described below, the orchestrator component 130 may send the NLU data to the skill component 190*a* based on the skill component 190*a* being capable of generating output data responsive to the command included in the spoken input from the user 105. In some embodiments, the skill component 190*a* may communicate with a skill support system(s) 125 to generate the output data.

The skill component 190*a* may determine output data responsive to the spoken input. The output data may correspond to a natural language output which may be presented by the device 110 as synthesized speech or displayed text. The output data may include text, other type natural language representation data, images, graphics, etc.

The skill component 190*a* may send (step 7) the output data to the orchestrator component 130. The orchestrator component 130 may send (step 8) data to the user device 110 causing it to perform an action in accordance with the output data from the skill component 190*a*. The user device 110 may present audio representing synthesized speech, may display text, graphics, images, etc., may output a notification (e.g., an app notification, a push notification, etc.), may cause a light (e.g., a yellow light ring) or other visual output device to activate, etc. The output data may be presented via the user device 110 or via another device that is associated with the user 105.

FIG. 3 is a conceptual diagram showing how an entity catalog may be pruned, according to embodiments of the present disclosure. A gating component may be used to determine which entities, from an entity catalog 302, are beneficial for neural biasing for ASR processing and which entities can be ignored for biasing purposes. A gating component 305 may be used for this purpose. In some embodiments, the gating component 305 may be jointly trained with ASR processing, so that the gating component 305 may identify entities that the ASR component 150 is able to recognize without entity biasing. In such embodiments, the gating component 305 may be configured based on the RNN-T loss of the ASR model(s), in a manner similar to the gating component 154. In other embodiments, the gating component 305 may be configured based on a loss of a language model. In yet other embodiments, the gating component 305 may be configured using another type of model. The gating component 305 may be configured to process entity embeddings which may be text embeddings in some embodiments.

The ASR component 150 may be capable of recognizing certain entities with a high confidence level based on the training data used to the train the ASR model components (e.g., the joint network 158 and the prediction network 250). For example, words like "mom", "office", "home" etc. may be recognized by the ASR component 150 without needing entity biasing. However, the entity catalog 302 may include these entities (e.g., "mom", "office", "home", etc. as user-defined contact names), and these entities may be processed by the catalog encoder 210 and the biasing component 156, adding to compute cost and latency. As described in relation to FIG. 3, such entities may be pruned (i.e., removed) before providing the entity catalog to the biasing component 156.

The entity catalog 302 may include custom entities associated with the user profile of the user 105, the device profile of the user device 110, and/or a group profile to which the user 105 and/or the user device 110 belong (i.e., with which the user profile and/or the device profile are associated). The catalog encoder 210 may process the entity catalog 302 to generate entity embeddings 304, where individual entity embeddings correspond to individual entities. The gating component 154 may process the entity embeddings 304 to generate a weight vector 306. The weight vector 306 may include weight values corresponding to individual entity embeddings in the entity embeddings 304. The gating component 154 may determine the weight vector 306 based on the ability of the ASR component 150 to process audio frames corresponding to the entity. For example, if the ASR component 150 is able to determine a first entity with a certain level (e.g., high) of confidence by processing audio data, then the weight value determined by the gating component 154 may be small, indicating that entity biasing is not needed for the first entity. As a further example, if the ASR component 150 is able to determine a second entity with a certain level (e.g., low) of confidence by processing audio data, then the weight value determined by the gating component 154 may be large, indicating that entity biasing is needed for the second entity to help increase ASR accuracy.

A pruning component 308 may apply the weight vector 306 to the entity embeddings 304, for example, via an elementwise multiplication operation. Of the resulting embeddings, ones that satisfy a condition (e.g., exceed a threshold value) may be included in the pruned entity catalog 310 by the pruning component 308, and those that do not satisfy a condition (e.g., less than a threshold value) may be excluded from the pruned entity catalog 310 by the pruning component 308.

The foregoing steps may be performed during offline operations (i.e., not while processing a received user input), and the pruned entity catalog 310 may be stored in association with the user profile of the user 105, the device profile of the user device 110, and/or a group profile to which the user 105 and/or the user device 110 belong (i.e., with which the user profile and/or the device profile are associated). The stored pruned entity catalog 310 may then be used during online operations by the biasing component 156 while processing audio frames of a spoken input received by the user device 110. In this manner, the gating component 154 can be used to prune large catalogs of contextual entities and to keep only those contextual entities that will be beneficial for accurate ASR transcription.

The gating component 154 described herein can also be used to prevent certain undesirable processing by the system. For example, some machine learning models may generate a "hallucination" output. Such a hallucination output may be a confident response by the machine learning model that does not seem to be justified by its training data. A hallucination may be machine-generated content that is nonsensical or unfaithful to the training data. In some cases, errors in encoding and decoding between text and representations may cause hallucinations. Hallucinations are more likely to occur when entity biasing is enabled for every audio frame. The gating component 154 disables entity biasing for the audio frames that do not need it, and thus, limits entity biasing to the audio frames where a custom entity is present. Hallucinations for other parts of the utterance/audio data may disappear since entity biasing will be switched off for the other parts.

Figure 4:
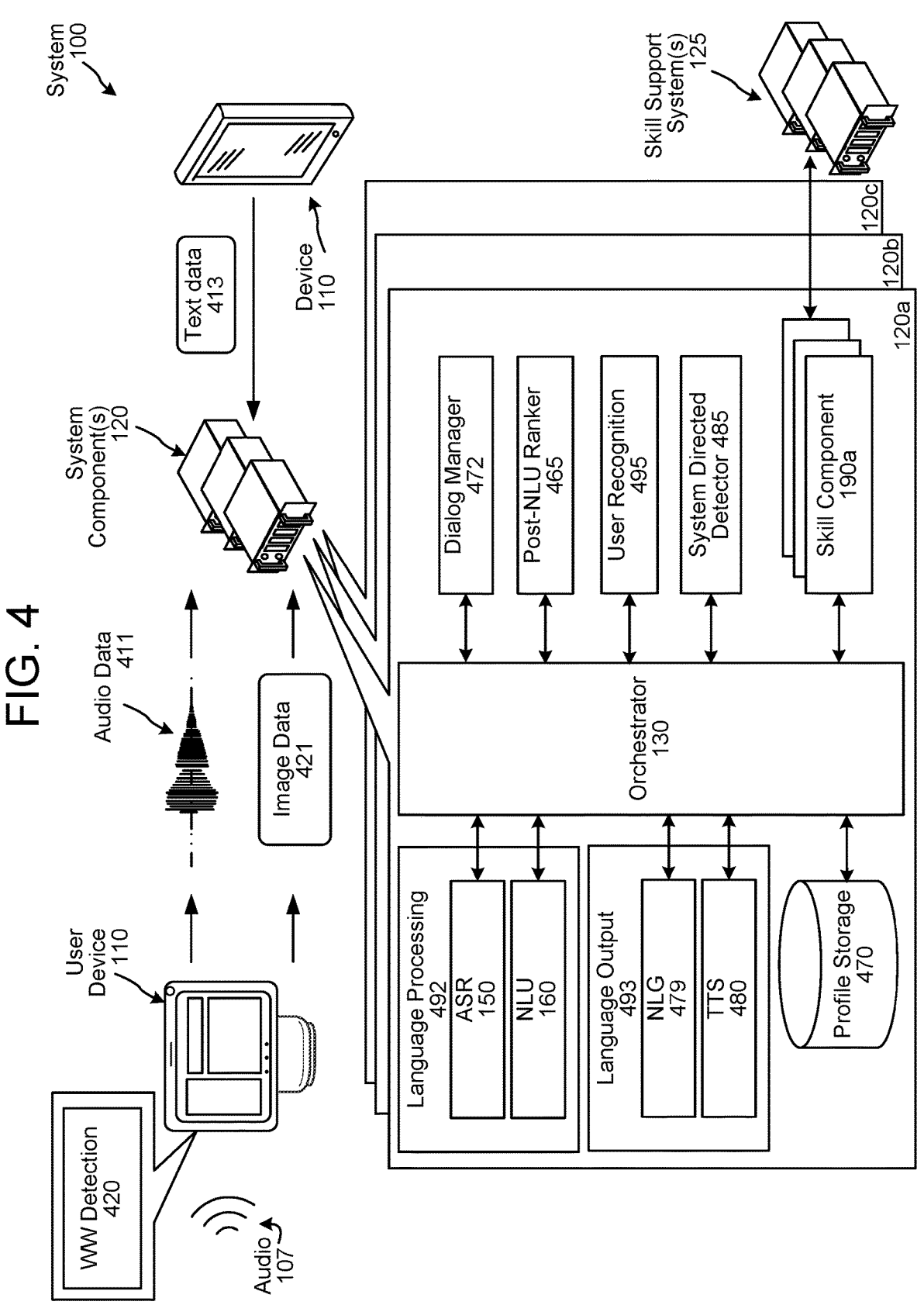
FIG. 4 is a conceptual diagram of components of the system, according to embodiments of the present disclosure.

The system 100 may operate using various components as described in FIG. 4. The various components may be located on same or different physical devices. Communication between various components may occur directly or across a network(s) 199. The device 110 may include audio capture component(s), such as a microphone or array of microphones of a device 110, captures audio 107 and creates corresponding audio data. Once speech is detected in audio data representing the audio 107, the device 110 may determine if the speech is directed at the device 110/system component(s) 120. In at least some embodiments, such determination may be made using a wakeword detection component 420.

The wakeword detection component 420 may process the audio data, representing the audio 107, to determine whether speech is represented therein. The user device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection may be performed without performing linguistic analysis, textual analysis, or semantic analysis. Instead, the audio data, representing the audio 107, is analyzed to determine if specific characteristics of the audio data match preconfigured acoustic waveforms, audio signatures, or other data corresponding to a wakeword. Thus, the wakeword detection component 420 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech can include other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 420 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 420, the user device 110 may "wake" and begin transmitting audio data 411/511 (shown in FIGS. 4 and 5), representing the audio 107, to the system component(s) 120. The audio data 411 may include data corresponding to the wakeword.

The wakeword detection component 420 may be configured to detect various wakewords. In at least some examples, each wakeword may correspond to a name of a different digital assistant. An example wakeword/digital assistant name is "Alexa." In another example, input to the system may be in form of text data 413, for example as a result of a user typing an input into a user interface of device 110. Other input forms may include indication that the user has pressed a physical or virtual button on device 110, the user has made a gesture, etc. The device 110 may also capture images using camera(s) 618 of the device 110 and may send image data 421 representing those image(s) to the system component(s) 120. The image data 421 may include raw image data or image data processed by the device 110 before sending to the system component(s) 120. The image data 421 may be used in various manners by different components of the system to perform operations such as determining whether a user is directing an utterance to the system, interpreting a user command, responding to a user command, etc.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

Once the wakeword is detected by the wakeword detection component 420 and/or input is detected by an input detector, the device 110 may "wake" and begin transmitting audio data 411, representing the audio 107, to the system component(s) 120. The audio data 411 may include data corresponding to the wakeword; in other embodiments, the portion of the audio corresponding to the wakeword is removed by the device 110 prior to sending the audio data 411 to the system component(s) 120. In the case of touch input detection- or gesture-based input detection, the audio data may not include a wakeword.

In some implementations, the system 100 may include more than one system component(s) 120. The system components 120 may respond to different wakewords and/or perform different categories of tasks. Each system component(s) 120 may be associated with its own wakeword such that speaking a certain wakeword results in audio data be sent to and processed by a particular system. For example, detection of the wakeword "Alexa" by the wakeword detection component 420 may result in sending audio data to system component(s) 120a for processing while detection of the wakeword "Computer" by the wakeword detector may result in sending audio data to system component(s) 120b for processing. The system may have a separate wakeword and system for different skills/systems (e.g., "Dungeon Master" for a game play skill/system component(s) 120c) and/or such skills/systems may be coordinated by one or more skill component(s) 190 of one or more system components 120.

The system component(s) 120 may include a system directed input detector 485. The system directed input detector 485 may be configured to determine whether an input to the system (for example speech, a gesture, etc.) is directed to the system or not directed to the system (for example directed to another user, etc.). The system directed input detector 485 may work in conjunction with the wakeword detector 420. If the system directed input detector 485 determines an input is directed to the system, the device 110 may "wake" and begin sending captured data for further processing (for example, processing audio data using the language processing 492/592, processing captured image data 421, or the like). If data is being processed the device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 485 determines an input is not directed to the system (such as a speech or gesture directed to another user) the device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 485 is determining whether an input is potentially device directed. For example, the system may output an orange indicator while considering an input, and may output a green indicator if a system directed input is detected. Other such configurations are possible.

Upon receipt by the system component(s) 120, the audio data 411 may be sent to an orchestrator component 130. The orchestrator component 130 may include memory and logic that enables the orchestrator component 130 to transmit various pieces and forms of data to various components of the system, as well as perform other operations as described herein.

The orchestrator component 130 may send the audio data 411 to a language processing component 492. The language processing component 492 (sometimes also referred to as a spoken language understanding (SLU) component) includes an automatic speech recognition (ASR) component 150 and a natural language understanding (NLU) component 160. The ASR component 150 may transcribe the audio data 411 into text data, tokenized data or other word representation data. The ASR data output by the ASR component 150 represents one or more than one (e.g., in the form of an N-best list) ASR hypotheses representing speech represented in the audio data 411.

In some embodiments, the ASR component 150 interprets the speech in the audio data 411 based on a similarity between the audio data 411 and pre-established language models. For example, the ASR component 150 may compare the audio data 411 with models for sounds (e.g., acoustic units such as phonemes, senons, phones, etc.) and sequences of sounds to identify words that match the sequence of sounds of the speech represented in the audio data 411. In some embodiments, the ASR component 150 may use one or more machine learning models, for example, neural network models, RNN models, RNN-T models, etc. The ASR component 150 sends the ASR data generated thereby to an NLU component 160, via, in some embodiments, the orchestrator component 130. The ASR data sent from the ASR component 150 to the NLU component 160 may include a single top-scoring ASR hypothesis or may include an N-best list including multiple top-scoring ASR hypotheses. An N-best list may additionally include a respective score associated with each ASR hypothesis represented therein.

The speech processing system 492 may further include a NLU component 160. The NLU component 160 may receive the ASR data from the ASR component 150. The NLU component 160 may attempts to make a semantic interpretation of the phrase(s) or statement(s) represented in the text data input therein by determining one or more meanings associated with the phrase(s) or statement(s) represented in the text data. The NLU component 160 may determine an intent representing an action that a user desires be performed and may determine information that allows a device (e.g., the device 110, the system component(s) 120, a skill component 190, a skill support system(s) 125, etc.) to execute the intent. For example, if the ASR data corresponds to "play the 5th Symphony by Beethoven," the NLU component 160 may determine an intent that the system output music and may identify "Beethoven" as an artist/composer and "5th Symphony" as the piece of music to be played. For further example, if the ASR data corresponds to "what is the weather," the NLU component 160 may determine an intent that the system output weather information associated with a geographic location of the device 110. In another example, if the text data corresponds to "turn off the lights," the NLU component 160 may determine an intent that the system turn off lights associated with the device 110 or the user 105. However, if the NLU component 160 is unable to resolve the entity—for example, because the entity is referred to by anaphora such as "this song" or "my next appointment"—the speech processing system 492 can send a decode request to another speech processing system 492 for information regarding the entity mention and/or other context related to the utterance. The speech processing system 492 may augment, correct, or base results data upon the audio data 411 as well as any data received from the other speech processing system 492.

The NLU component 160 may return NLU results data (which may include tagged text data, indicators of intent, etc.) back to the orchestrator component 130. The orchestrator component 130 may forward the NLU results data to a skill component(s) 190. If the NLU results data includes a single NLU hypothesis, the NLU component 160 and the orchestrator component 130 may direct the NLU results data to the skill component(s) 190 associated with the NLU hypothesis. If the NLU results data includes an N-best list of NLU hypotheses, the NLU component 160 and the orchestrator component 130 may direct the top scoring NLU hypothesis to a skill component(s) 190 associated with the top scoring NLU hypothesis. The system may also include a post-NLU ranker 465 which may incorporate other information to rank potential interpretations determined by the NLU component 160. The local device 110 may also include its own post-NLU ranker 565, which may operate similarly to the post-NLU ranker 465.

A skill component may be software running on the system component(s) 120 that is akin to a software application. That is, a skill component 190 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 190. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 190 may operate in conjunction between the system component(s) 120 and other devices, such as the device 110, in order to complete certain functions. Inputs to a skill component 190 may come from speech processing interactions or through other interactions or input sources. A skill component 190 may include hardware, software, firmware, or the like that may be dedicated to a particular skill component 190 or shared among different skill components 190.

A skill support system(s) 125 may communicate with a skill component(s) 190 within the system component(s) 120 and/or directly with the orchestrator component 130 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system component(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 190 dedicated to interacting with the skill support system(s) 125. Unless expressly stated otherwise, reference to a skill, skill device, or skill component may include a skill component 190 operated by the system component(s) 120 and/or skill operated by the skill support system(s) 125. Moreover, the functionality described herein as a skill or skill may be referred to using many different terms, such as an action, bot, app, or the like. The skill 190 and or skill support system(s) 125 may return output data to the orchestrator component 130.

The post-NLU ranker 465 may include a statistical component that produces a ranked list of intent/skill pairs with associated confidence scores. Each confidence score may indicate an adequacy of the skill's execution of the intent with respect to NLU results data associated with the skill. The post-NLU ranker 465 may operate one or more trained models configured to process the NLU results data, skill result data, and the other data in order to output ranked output data. The ranked output data may include an n-best list where the NLU hypotheses in the NLU results data are reordered such that the n-best list in the ranked output data represents a prioritized list of skills to respond to a user input as determined by the post-NLU ranker 465. The ranked output data may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 465 enables the system to better determine the best skill to execute the user input. For example, first and second NLU hypotheses in the NLU results data may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 465 (or other scheduling component such as orchestrator component 130) may solicit the first skill and the second skill to provide potential result data based on the first NLU hypothesis and the second NLU hypothesis, respectively. For example, the post-NLU ranker 465 may send the first NLU hypothesis to the first skill 190*a* along with a request for the first skill 190*a* to at least partially execute with respect to the first NLU hypothesis. The post-NLU ranker 465 may also send the second NLU hypothesis to the second skill 190*b* along with a request for the second skill 190*b* to at least partially execute with respect to the second NLU hypothesis. The post-NLU ranker 465 receives, from the first skill 190*a*, first result data generated from the first skill 190*a*'s execution with respect to the first NLU hypothesis. The post-NLU ranker 465 also receives, from the second skill 190*b*, second results data generated from the second skill 190*b*'s execution with respect to the second NLU hypothesis.

The post-NLU ranker 465 may consider the first skill result data and the second skill result data to alter the first confidence score and the second confidence score of the first NLU hypothesis and the second NLU hypothesis, respectively. That is, the post-NLU ranker 465 may generate a third confidence score based on the first result data and the first confidence score. The third confidence score may correspond to how likely the post-NLU ranker 465 determines the first skill will correctly respond to the user input. The post-NLU ranker 465 may also generate a fourth confidence score based on the second result data and the second confidence score. One skilled in the art will appreciate that a first difference between the third confidence score and the fourth confidence score may be greater than a second difference between the first confidence score and the second confidence score. The post-NLU ranker 465 may also consider the other data to generate the third confidence score and the fourth confidence score. While it has been described that the post-NLU ranker 465 may alter the confidence scores associated with first and second NLU hypotheses, one skilled in the art will appreciate that the post-NLU ranker 465 may alter the confidence scores of more than two NLU hypotheses. The post-NLU ranker 465 may select the result data associated with the skill 190 with the highest altered confidence score to be the data output in response to the current user input. The post-NLU ranker 465 may also consider the ASR output data to alter the NLU hypotheses confidence scores.

The orchestrator component 130 may, prior to sending the NLU results data to the post-NLU ranker 465, associate intents in the NLU hypotheses with skills 190. For example, if a NLU hypothesis includes a <PlayMusic> intent, the orchestrator component 130 may associate the NLU hypothesis with one or more skills 190 that can execute the <PlayMusic> intent. Thus, the orchestrator component 130 may send the NLU results data, including NLU hypotheses paired with skills 190, to the post-NLU ranker 465. In response to ASR output data corresponding to "what should I do for dinner today," the orchestrator component 130 may generates pairs of skills 190 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 465 queries each skill 190, paired with a NLU hypothesis in the NLU output data, to provide skill result data based on the NLU hypothesis with which it is associated. That is, with respect to each skill, the post-NLU ranker 465 colloquially asks each skill "if given this NLU hypothesis, what would you do with it." According to the above example, the post-NLU ranker 465 may send skills 190 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 465 may query each of the skills 190 in parallel or substantially in parallel.

A skill 190 may provide the post-NLU ranker 465 with various data and indications in response to the post-NLU ranker 465 soliciting the skill 190 for result data. A skill 190 may simply provide the post-NLU ranker 465 with an indication of whether or not the skill can execute with respect to the NLU hypothesis it received. A skill 190 may also or alternatively provide the post-NLU ranker 465 with output data generated based on the NLU hypothesis it received. In some situations, a skill 190 may need further information in addition to what is represented in the received NLU hypothesis to provide output data responsive to the user input. In these situations, the skill 190 may provide the post-NLU ranker 465 with result data indicating slots of a framework that the skill 190 further needs filled or entities that the skill 190 further needs resolved prior to the skill 190 being able to provided result data responsive to the user input. The skill 190 may also provide the post-NLU ranker 465 with an instruction and/or computer-generated speech indicating how the skill 190 recommends the system solicit further information needed by the skill 190. The skill 190 may further provide the post-NLU ranker 465 with an indication of whether the skill 190 will have all needed information after the user provides additional information a single time, or whether the skill 190 will need the user to provide various kinds of additional information prior to the skill 190 having all needed information. According to the above example, skills 190 may provide the post-NLU ranker 465 with the following:

Skill 1: indication representing the skill can execute with respect to a NLU hypothesis including the <Help> intent indicator
Skill 2: indication representing the skill needs to the system to obtain further information
Skill 3: indication representing the skill can provide numerous results in response to the third NLU hypothesis including the <DishType> intent indicator The post-NLU ranker 465 uses the result data provided by the skills 190 to alter the NLU confidence scores. That is, the post-NLU ranker 465 uses the result data provided by the queried skills 190 to create larger differences between the NLU confidence scores generated by the NLU component 160. Without the post-NLU ranker 465, the system may not be confident enough to determine an output in response to a user input, for example when the NLU hypotheses associated with multiple skills are too close for the system to confidently determine a single skill 190 to invoke to respond to the user input. For example, if the system does not implement the post-NLU ranker 465, the system may not be able to determine whether to obtain output data from a general reference information skill or a medical information skill in response to a user input corresponding to "what is acne."

The post-NLU ranker 465 may prefer skills 190 that provide result data responsive to NLU hypotheses over skills 190 that provide result data corresponding to an indication that further information is needed, as well as skills 190 that provide result data indicating they can provide multiple responses to received NLU hypotheses. For example, the post-NLU ranker 465 may generate a first score for a first skill 190a that is greater than the first skill's NLU confidence score based on the first skill 190a providing result data including a response to a NLU hypothesis. For further example, the post-NLU ranker 465 may generate a second score for a second skill 190b that is less than the second skill's NLU confidence score based on the second skill 190b providing result data indicating further information is needed for the second skill 190b to provide a response to a NLU hypothesis. Yet further, for example, the post-NLU ranker 465 may generate a third score for a third skill 190c that is less than the third skill's NLU confidence score based on the third skill 190c providing result data indicating the third skill 190c can provide multiple responses to a NLU hypothesis.

The post-NLU ranker 465 may consider other data in determining scores. The other data may include rankings associated with the queried skills 190. A ranking may be a system ranking or a user-specific ranking. A ranking may indicate a veracity of a skill from the perspective of one or more users of the system. For example, the post-NLU ranker 465 may generate a first score for a first skill 190a that is greater than the first skill's NLU processing confidence score based on the first skill 190a being associated with a high ranking. For further example, the post-NLU ranker 465 may generate a second score for a second skill 190b that is less than the second skill's NLU processing confidence score based on the second skill 190b being associated with a low ranking.

The other data may include information indicating whether or not the user that originated the user input has enabled one or more of the queried skills 190. For example, the post-NLU ranker 465 may generate a first score for a first skill 190a that is greater than the first skill's NLU processing confidence score based on the first skill 190a being enabled by the user that originated the user input. For further example, the post-NLU ranker 465 may generate a second score for a second skill 190b that is less than the second skill's NLU processing confidence score based on the second skill 190b not being enabled by the user that originated the user input. When the post-NLU ranker 465 receives the NLU results data, the post-NLU ranker 465 may determine whether profile data, associated with the user and/or device that originated the user input, includes indications of enabled skills.

The other data may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 465 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 465 may increase the NLU processing confidence score associated with a first skill configured to output visual data and/or decrease the NLU processing confidence score associated with a second skill configured to output audio data.

The other data may include information indicating the type of device that originated the user input. For example, the device may correspond to a "hotel room" type if the device is located in a hotel room. If a user inputs a command corresponding to "order me food" to the device located in the hotel room, the post-NLU ranker 465 may increase the NLU processing confidence score associated with a first skill 190a corresponding to a room service skill associated with the hotel and/or decrease the NLU processing confidence score associated with a second skill 190b corresponding to a food skill not associated with the hotel.

The other data may include information indicating a location of the device and/or user that originated the user input. The system may be configured with skills 190 that may only operate with respect to certain geographic locations. For example, a user may provide a user input corresponding to "when is the next train to Portland." A first skill 190a may operate with respect to trains that arrive at, depart from, and pass through Portland, Oregon. A second skill 190b may operate with respect to trains that arrive at, depart from, and pass through Portland, Maine. If the device and/or user that originated the user input is located in Seattle, Washington, the post-NLU ranker 465 may increase the NLU processing confidence score associated with the first skill 190a and/or decrease the NLU processing confidence score associated with the second skill 190b. Likewise, if the device and/or user that originated the user input is located in Boston, Massachusetts, the post-NLU ranker 465 may increase the NLU processing confidence score associated with the second skill 190b and/or decrease the NLU processing confidence score associated with the first skill 190a.

The other data may include information indicating a time of day. The system may be configured with skills 190 that operate with respect to certain times of day. For example, a user may provide a user input corresponding to "order me food." A first skill 190a may generate first result data corresponding to breakfast. A second skill 190b may generate second result data corresponding to dinner. If the system(s) 120 receives the user input in the morning, the post-NLU ranker 465 may increase the NLU processing confidence score associated with the first skill 190a and/or decrease the NLU processing score associated with the second skill 190b. If the system(s) 120 receives the user input in the afternoon or evening, the post-NLU ranker 465 may increase the NLU processing confidence score associated with the second skill 190b and/or decrease the NLU processing confidence score associated with the first skill 190a.

The other data may include information indicating user preferences. The system may include multiple skills 190 configured to execute in substantially the same manner. For example, a first skill 190a and a second skill 190b may both be configured to order food from respective restaurants. The system may store a user preference (e.g., in the profile storage 470) that is associated with the user that provided the user input to the system components(s) 120 as well as indicates the user prefers the first skill 190a over the second skill 190b. Thus, when the user provides a user input that may be executed by both the first skill 190a and the second skill 190b, the post-NLU ranker 465 may increase the NLU processing confidence score associated with the first skill 190a and/or decrease the NLU processing confidence score associated with the second skill 190b.

The other data may include information indicating system usage history associated with the user that originated the user input. For example, the system usage history may indicate the user originates user inputs that invoke a first skill 190a more often than the user originates user inputs that invoke a second skill 190b. Based on this, if the present user input may be executed by both the first skill 190a and the second skill 190b, the post-NLU ranker 465 may increase the NLU processing confidence score associated with the first skill 190a and/or decrease the NLU processing confidence score associated with the second skill 190b.

It has been described that the post-NLU ranker 465 uses the other data to increase and decrease NLU confidence scores associated with various skills 190 that the post-NLU ranker 465 has already requested result data from. Alternatively, the post-NLU ranker 465 may use the other data to determine which skills 190 to request result data from. For example, the post-NLU ranker 465 may use the other data to increase and/or decrease NLU processing confidence scores associated with skills 190 associated with the NLU results data output by the NLU component 160. The post-NLU ranker 465 may select n-number of top scoring altered NLU processing confidence scores. The post-NLU ranker 465 may then request result data from only the skills 190 associated with the selected n-number of NLU processing confidence scores.

As described, the post-NLU ranker 465 queries multiple skills associated with the NLU results data to provide result data to the post-NLU ranker 465 prior to the post-NLU ranker 465 ultimately determining the skill 190 to be invoked to respond to the user input. Some of the skills 190 may provide result data indicating responses to NLU hypotheses while other skills 190 may providing result data indicating the skills cannot provide responsive data. Whereas a system not implementing the post-NLU ranker 465 may select one of the skills 190 that could not provide a response, the post-NLU ranker 465 only selects a skill 190 that provides the post-NLU ranker 465 with result data corresponding to a response, indicating further information is needed, or indicating multiple responses can be generated.

The post-NLU ranker 465 may select result data, associated with the skill 190 associated with the highest score, for output to the user. Alternatively, the post-NLU ranker 465 may output ranked output data indicating skills 190 and their respective post-NLU ranker rankings. Since the post-NLU ranker 465 receives result data, potentially corresponding to a response to the user input, from the skills 190 prior to post-NLU ranker 465 selecting one of the skills or outputting the ranked output data, little to no latency occurs from the time skills provide result data and the time the system outputs responds to the user.

If the post-NLU ranker 465 selects result audio data to be output to a user and the system determines content should be output audibly, the post-NLU ranker 465 (or another component of the system(s) 120) may cause the device 110*a* and/or the device 110*b* to output audio corresponding to the result audio data. If the post-NLU ranker 465 selects result text data to output to a user and the system determines content should be output visually, the post-NLU ranker 465 (or another component of the system(s) 120) may cause the device 110*b* to display text corresponding to the result text data. If the post-NLU ranker 465 selects result audio data to output to a user and the system determines content should be output visually, the post-NLU ranker 465 (or another component of the system(s) 120) may send the result audio data to the ASR component 150. The ASR component 150 may generate output text data corresponding to the result audio data. The system(s) 120 may then cause the device 110*b* to display text corresponding to the output text data. If the post-NLU ranker 465 selects result text data to output to a user and the system determines content should be output audibly, the post-NLU ranker 465 (or another component of the system(s) 120) may send the result text data to the TTS component 480. The TTS component 480 may generate output audio data (corresponding to computer-generated speech) based on the result text data. The system(s) 120 may then cause the device 110*a* and/or the device 110*b* to output audio corresponding to the output audio data.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

As used herein, a "dialog," "dialog session," "session," or the like refers to various related user inputs and system responses, for example inputs and outputs related to an ongoing exchange between a user and the system.

A dialog may be goal-oriented, meaning the dialog is directed to the system performing a specific action requested by a user (such as figuring out what music the system should play). Alternatively, a dialog may not be goal-oriented, for example as part of a freeform conversation between the system and a user that may not have a definite end point or action in mind at the end of the conversation. For example, a user may ask a system "Alexa, tell me something interesting" or "Alexa, let's have a conversation." System components that control what actions the system takes in response to various user inputs of a dialog may sometimes be referred to as chatbots.

A user input and performance by the system of a corresponding action responsive to the user input, may be referred to as a dialog "turn." A dialog session identifier may be associated with multiple related turns corresponding to consecutive related user inputs. One user input may be considered related to a subsequent user input, thereby causing a single dialog session identifier to be associated with both user inputs, based on, for example, a length of time between receipt of the first user input and receipt of the subsequent user input, a length of time between performance of an action responsive to the first user input and receipt of the subsequent user input, and/or the substance of the user input or the system response.

The system(s) 100 may include a dialog manager component 472 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 472 may associate a dialog session identifier with the dialog upon identifying that the user is engaging in a dialog with the user. The dialog manager component 472 may track a user input and the corresponding system generated response to the user input as a turn. The dialog session identifier may correspond to multiple turns of user input and corresponding system generated response. The dialog manager component 472 may transmit data identified by the dialog session identifier directly to the orchestrator component 130 or other component. Depending on system configuration the dialog manager 472 may determine the appropriate system generated response to give to a particular utterance or user input of a turn. Or creation of the system generated response may be managed by another component of the system (e.g., the language output component 493, NLG 479, orchestrator component 130, etc.) while the dialog manager 472 selects the appropriate responses. Alternatively, another component of the system component(s) 120 may select responses using techniques discussed herein. The text of a system generated response may be sent to a TTS component 480 for creation of audio data corresponding to the response. The audio data may then be sent to a user device (e.g., device 110) for ultimate output to the user. Alternatively (or in addition) a dialog response may be returned in text or some other form.

The dialog manager 472 may receive the ASR hypothesis/ hypotheses (i.e., text data) and make a semantic interpretation of the phrase(s) or statement(s) represented therein. That is, the dialog manager 472 determines one or more meanings associated with the phrase(s) or statement(s) represented in the text data based on words represented in the text data. The dialog manager 472 determines a goal corresponding to an action that a user desires be performed as well as pieces of the text data that allow a device (e.g., the device 110, the system component(s) 120, a skill 190, a skill support system(s) 125, etc.) to execute the intent. If, for example, the text data corresponds to "what is the weather," the dialog manager 472 may determine that that the system component(s) 120 is to output weather information associated with a geographic location of the device 110. In another example, if the text data corresponds to "turn off the lights," the dialog manager 472 may determine that the system component(s) 120 is to turn off lights associated with the device(s) 110 or the user(s) 105.

The dialog manager 472 may send the results data to one or more skill component(s) 190. If the results data includes a single hypothesis, the orchestrator component 130 may send the results data to the skill component(s) 190 associated with the hypothesis. If the results data includes an N-best list of hypotheses, the orchestrator component 130 may send the top scoring hypothesis to a skill component(s) 190 associated with the top scoring hypothesis.

The system component(s) 120 includes a language output component 493. The language output component 493 includes a natural language generation (NLG) component 479 and a text-to-speech (TTS) component 480. The NLG component 479 can generate text for purposes of TTS output to a user. For example the NLG component 479 may generate text corresponding to instructions corresponding to a particular action for the user to perform. The NLG component 479 may generate appropriate text for various outputs as described herein. The NLG component 479 may include one or more trained models configured to output text appropriate for a particular input. The text output by the NLG component 479 may become input for the TTS component 480. Alternatively or in addition, the TTS component 480 may receive text data from a skill component 190 or other system component for output.

The NLG component 479 may include a trained model. The NLG component 479 generates text data (or other natural language representation data) from dialog data received by the dialog manager 472 such that the output text data has a natural feel and, in some embodiments, includes words and/or phrases specifically formatted for a requesting individual. The NLG component 479 may use templates to formulate responses, and/or the NLG component 479 may include models trained from the various templates for forming the output text data. For example, the NLG component 479 may analyze transcripts of local news programs, television shows, sporting events, or any other media program to obtain common components of a relevant language and/or region. As one illustrative example, the NLG component 479 may analyze a transcription of a regional sports program to determine commonly used words or phrases for describing scores or other sporting news for a particular region. The NLG component 479 may further receive, as inputs, a dialog history, an indicator of a level of formality, and/or a command history or other user history such as the dialog history.

The NLG component 479 may generate dialog data based on one or more response templates. Further continuing the example above, the NLG component 479 may select a template in response to the question, "What is the weather currently like?" of the form: "The weather currently is $weather_information$." The NLG component 479 may analyze the logical form of the template to produce one or more textual responses including markups and annotations to familiarize the response that is generated. In some embodiments, the NLG component 479 may determine which response is the most appropriate response to be selected. The selection may, therefore, be based on past responses, past questions, a level of formality, and/or any other feature, or any other combination thereof. Responsive audio data representing the response generated by the NLG component 479 may then be generated using the text-to- speech component 480.

The TTS component 480 may generate audio data (e.g., synthesized speech) from text data using one or more different methods. Text data input to the TTS component 480 may come from a skill component 190, the orchestrator component 130, or another component of the system. In one method of synthesis called unit selection, the TTS component 480 matches text data against a database of recorded speech. The TTS component 480 selects matching units of recorded speech and concatenates the units together to form audio data. In another method of synthesis called parametric synthesis, the TTS component 480 varies parameters such as frequency, volume, and noise to create audio data including an artificial speech waveform. Parametric synthesis uses a computerized voice generator, sometimes called a vocoder.

The device 110 may include image and/or video capture components such as a camera or cameras to capture one or more images. The device 110 may include circuitry for digitizing the images and/or video for transmission to the system component(s) 120 as image data. The device 110 may further include circuitry for voice command-based control of the camera, allowing a user 105 to request capture of image or video data. The device 110 may process the commands locally or send audio data 411 representing the commands to the system component(s) 120 for processing, after which the system component(s) 120 may return output data that can cause the device 110 to engage its camera.

Upon receipt by the system component(s) 120, the image data 421 may be sent to an orchestrator component 130. The orchestrator component 130 may send the image data 421 to an image processing component that can perform computer vision functions such as object recognition, modeling, reconstruction, etc. For example, the image processing component may detect a person, face, etc. (which may then be identified using user recognition component 495). The device 110 may also include its own image processing component.

In some implementations, the image processing component can detect the presence of text in an image. In such implementations, the image processing component can recognize the presence of text, convert the image data to text data, and send the resulting text data via the orchestrator component 130 to the language processing component 492 for processing by the NLU component 160.

The system component(s) 120 may include a user recognition component 495 that recognizes one or more users using a variety of data. However, the disclosure is not limited thereto, and the device 110 may include a user recognition component 595 instead of and/or in addition to user recognition component 495 of the system component(s) 120 without departing from the disclosure. User recognition component 595 operates similarly to user recognition component 495.

The user-recognition component 495 may take as input the audio data 411 and/or text data output by the ASR component 150. The user-recognition component 495 may perform user recognition by comparing audio characteristics in the audio data 411 to stored audio characteristics of users. The user-recognition component 495 may also perform user recognition by comparing biometric data (e.g., fingerprint data, iris data, etc.), received by the system in correlation with the present user input, to stored biometric data of users assuming user permission and previous authorization. The user-recognition component 495 may further perform user recognition by comparing image data (e.g., including a representation of at least a feature of a user), received by the system in correlation with the present user input, with stored image data including representations of features of different users. The user-recognition component 495 may perform additional user recognition processes, including those known in the art.

The user-recognition component 495 determines scores indicating whether user input originated from a particular user. For example, a first score may indicate a likelihood that the user input originated from a first user, a second score may indicate a likelihood that the user input originated from a second user, etc. The user-recognition component 495 also determines an overall confidence regarding the accuracy of user recognition operations.

Output of the user-recognition component 495 may include a single user identifier corresponding to the most likely user that originated the user input. Alternatively, output of the user-recognition component 495 may include an N-best list of user identifiers with respective scores indicating likelihoods of respective users originating the user input. The output of the user-recognition component 495 may be used to inform NLU processing as well as processing performed by other components of the system.

The system 100 (either on device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 470 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 470 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 5:
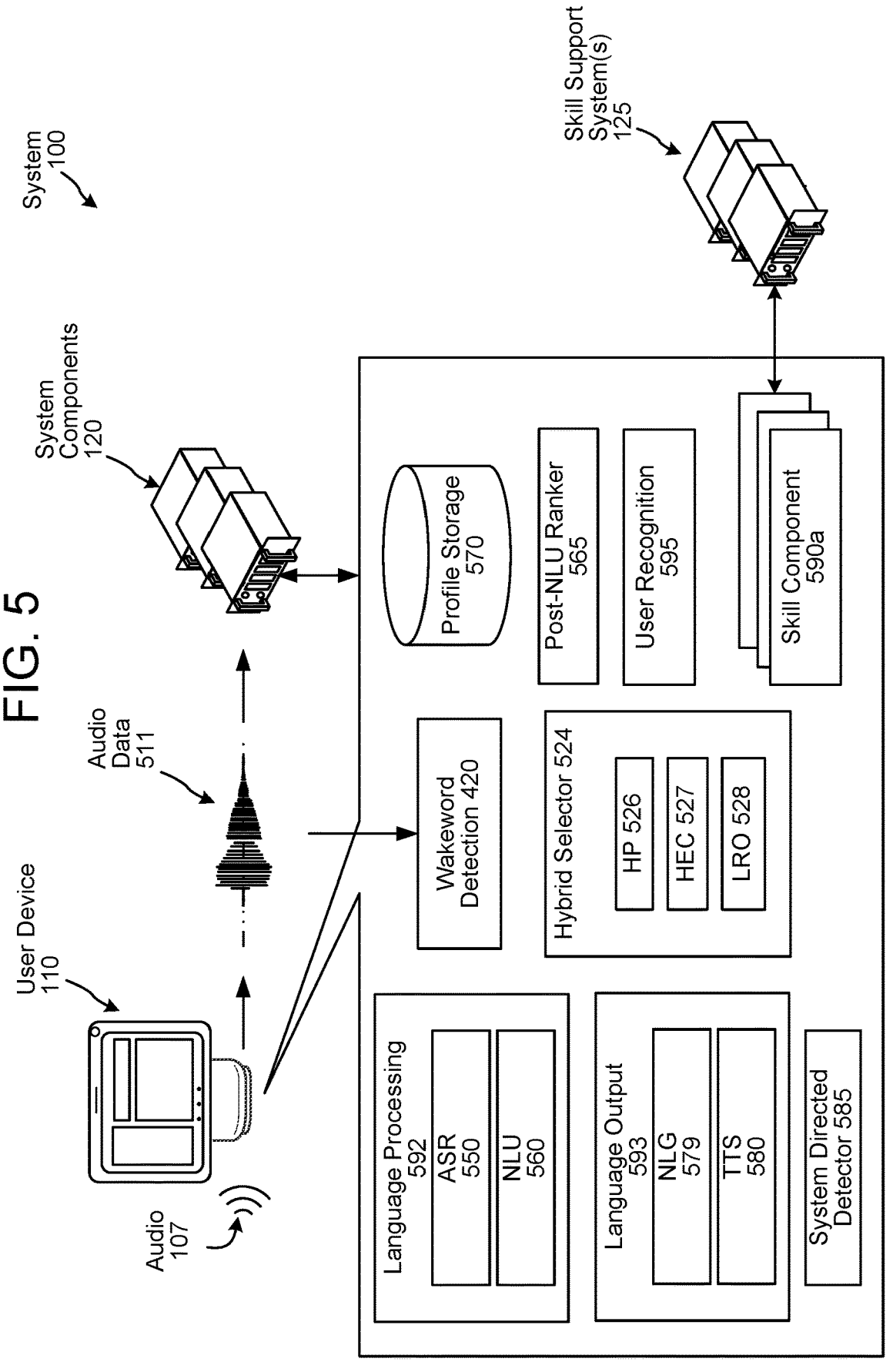
FIG. 5 is a conceptual diagram illustrating components that may be included in a device, according to embodiments of the present disclosure.

Although the components of FIG. 4 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. FIG. 5 illustrates such a configured user device 110.

In at least some embodiments, the system component(s) 120 may receive the audio data 411 from the device 110, to recognize speech corresponding to a spoken input in the received audio data 411, and to perform functions in response to the recognized speech. In at least some embodiments, these functions involve sending directives (e.g., commands), from the system component(s) 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system component(s) 120 over the network(s) 199, some or all of the functions capable of being performed by the system component(s) 120 may be performed by sending one or more directives over the network(s) 199 to the device 110, which, in turn, may process the directive(s) and perform one or more corresponding actions. For example, the system component(s) 120, using a remote directive that is included in response data (e.g., a remote response), may instruct the device 110 to output an audible response (e.g., using TTS processing performed by an on-device TTS component 580) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

As noted with respect to FIG. 1, the device 110 may include a wakeword detection component 420 configured to compare the audio data 411 to stored models used to detect a wakeword (e.g., "Alexa") that indicates to the device 110 that the audio data 411 is to be processed for determining NLU output data (e.g., slot data that corresponds to a named entity, label data, and/or intent data, etc.). In at least some embodiments, a hybrid selector 524, of the device 110, may send the audio data 411 to the wakeword detection component 420. If the wakeword detection component 420 detects a wakeword in the audio data 411, the wakeword detection component 420 may send an indication of such detection to the hybrid selector 524. In response to receiving the indication, the hybrid selector 524 may send the audio data 411 to the system component(s) 120 and/or the ASR component 550. The wakeword detection component 420 may also send an indication, to the hybrid selector 524, representing a wakeword was not detected. In response to receiving such an indication, the hybrid selector 524 may refrain from sending the audio data 411 to the system component(s) 120, and may prevent the ASR component 550 from further processing the audio data 411. In this situation, the audio data 411 can be discarded.

The device 110 may conduct its own speech processing using on-device language processing components, such as an SLU/language processing component 592 (which may include an ASR component 550 and an NLU 560), similar to the manner discussed herein with respect to the SLU component 492 (or ASR component 150 and the NLU component 160) of the system component(s) 120. Language processing component 592 may operate similarly to language processing component 492, ASR component 550 may operate similarly to ASR component 150 and NLU component 560 may operate similarly to NLU component 160. The device 110 may also internally include, or otherwise have access to, other components such as one or more skill components 590 capable of executing commands based on NLU output data or other results determined by the device 110/system component(s) 120 (which may operate similarly to skill components 190), a user recognition component 595 (configured to process in a similar manner to that discussed herein with respect to the user recognition component 495 of the system component(s) 120), profile storage 570 (configured to store similar profile data to that discussed herein with respect to the profile storage 470 of the system component(s) 120), or other components. In at least some embodiments, the profile storage 570 may only store profile data for a user or group of users specifically associated with the device 110. Similar to as described above with respect to skill component 190, a skill component 590 may communicate with a skill support system(s) 125. The device 110 may also have its own language output component 593 which may include NLG component 579 and TTS component 580. Language output component 593 may operate similarly to language processing component 493, NLG component 579 may operate similarly to NLG component 479 and TTS component 580 may operate similarly to TTS component 480.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system component(s) 120.

The hybrid selector 524, of the device 110, may include a hybrid proxy (HP) 526 configured to proxy traffic to/from the system component(s) 120. For example, the HP 526 may be configured to send messages to/from a hybrid execution controller (HEC) 527 of the hybrid selector 524. For example, command/directive data received from the system component(s) 120 can be sent to the HEC 527 using the HP 526. The HP 526 may also be configured to allow the audio data 511 to pass to the system component(s) 120 while also receiving (e.g., intercepting) this audio data 511 and sending the audio data 511 to the HEC 527.

In at least some embodiments, the hybrid selector 524 may further include a local request orchestrator (LRO) 528 configured to notify the ASR component 550 about the availability of new audio data 511 that represents user speech, and to otherwise initiate the operations of local language processing when new audio data 511 becomes available. In general, the hybrid selector 524 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system component(s) 120 and chooses to use that remotely-determined directive data.

Thus, when the audio data 511 is received, the HP 526 may allow the audio data 511 to pass through to the system component(s) 120 and the HP 526 may also input the audio data 511 to the on-device ASR component 550 by routing the audio data 511 through the HEC 527 of the hybrid selector 524, whereby the LRO 528 notifies the ASR component 550 of the audio data 511. At this point, the hybrid selector 524 may wait for response data from either or both of the system component(s) 120 or the local language processing components. However, the disclosure is not limited thereto, and in some examples the hybrid selector 524 may send the audio data 511 only to the local ASR component 550 without departing from the disclosure. For example, the device 110 may process the audio data 511 locally without sending the audio data 511 to the system component(s) 120.

The local ASR component 550 is configured to receive the audio data 511 from the hybrid selector 524, and to recognize speech in the audio data 511, and the local NLU component 560 is configured to determine a user intent from the recognized speech, and to determine how to act on the user intent by generating NLU output data which may include directive data (e.g., instructing a component to perform an action). Such NLU output data may take a form similar to that as determined by the NLU component 160 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 560) may be selected as usable to respond to a natural language user input, and local response data may be sent (e.g., local NLU output data, local knowledge base information, internet search results, and/or local directive data) to the hybrid selector 524, such as a "ReadyToExecute" response. The hybrid selector 524 may then determine whether to use directive data from the on-device components to respond to the natural language user input, to use directive data received from the system component(s) 120, assuming a remote response is even received (e.g., when the device 110 is able to access the system component(s) 120 over the network(s) 199), or to determine output audio requesting additional information from the user 105.

The device 110 and/or the system component(s) 120 may associate a unique identifier with each natural language user input. The device 110 may include the unique identifier when sending the audio data 511 to the system component(s) 120, and the response data from the system component(s) 120 may include the unique identifier to identify which natural language user input the response data corresponds.

In at least some embodiments, the device 110 may include, or be configured to use, one or more skill components 590 that may work similarly to the skill component(s) 190 implemented by the system component(s) 120. The skill component(s) 590 may correspond to one or more domains that are used in order to determine how to act on a spoken input in a particular way, such as by outputting a directive that corresponds to the determined intent, and which can be processed to implement the desired operation. The skill component(s) 590 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

A "domain" may include various skills relating to a particular area of interest. For example, a music domain may include various skills that can respond to a user's request to play music, enable a user to purchase music, etc. In another example, a smart-home domain may include skills that enable a user to control various home devices. A domain may correspond to different intents and entities. For example, the music domain may correspond to a Play Music intent, Add to Playlist intent, etc. As another example, the smart-home domain may correspond to Turn On intent, Turn Off intent, etc.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 590, a skill system 125, or a combination of a skill component 590 and a corresponding skill system 125.

Similar to the manner discussed with regard to FIG. 4, the local device 110 may be configured to recognize multiple different wakewords and/or perform different categories of tasks depending on the wakeword. Such different wakewords may invoke different processing components of local device 110 (not illustrated in FIG. 5). For example, detection of the wakeword "Alexa" by the wakeword detection component 420 may result in sending audio data to certain language processing components 592/skills 590 for processing while detection of the wakeword "Computer" by the wakeword detector may result in sending audio data different language processing components 592/skills 590 for processing.

One or more of the herein described system component(s) 120 components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. In another embodiment, the initial connection weights are assigned randomly. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data.

FIG. 6 is a block diagram conceptually illustrating a device 110 that may be used with the system. FIG. 7 is a block diagram conceptually illustrating example components of a remote device, such as the system component(s) 120, which may assist with ASR processing, NLU processing, etc., and the skill support system(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/ components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system of the present disclosure, such as one or more system components 120 for performing ASR processing, one or more system components 120 for performing NLU processing, one or more skill systems 125 for performing actions responsive to user inputs, etc. In operation, each of these systems may include computer-readable and computer-executable instructions that reside on the respective device (120/125), as will be discussed further below.

Each of these devices (110/120/125) may include one or more controllers/processors (604/704), which may each include a central processing unit (CPU) for processing data and computer-readable instructions, and a memory (606/ 706) for storing data and instructions of the respective device. The memories (606/706) may individually include volatile random access memory (RAM), non-volatile read only memory (ROM), non-volatile magnetoresistive memory (MRAM), and/or other types of memory. Each device (110/120/125) may also include a data storage component (608/708) for storing data and controller/processor-executable instructions. Each data storage component (608/ 708) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/ output device interfaces (602/702).

Computer instructions for operating each device (110/ 120/125) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120/125) includes input/output device interfaces (602/702). A variety of components may be connected through the input/output device interfaces (602/702), as will be discussed further below. Additionally, each device (110/120/125) may include an address/data bus (624/724) for conveying data among components of the respective device. Each component within a device (110/120/125) may also be directly connected to other components in addition to (or instead of) being connected to other components across the bus (624/724).

Referring to FIG. 6, the device 110 may include input/output device interfaces 602 that connect to a variety of components such as an audio output component such as a speaker 612, a wired headset or a wireless headset (not illustrated), or other component capable of outputting audio. The device 110 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 616 for displaying content. The device 110 may further include a camera 618.

Via antenna(s) 614, the input/output device interfaces 602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (602/702) may also include communication components that allow data to be exchanged between devices such as different physical servers in a collection of servers or other components.

The components of the device(s) 110, the system component(s) 120, or the skill support system(s) 125 may include their own dedicated processors, memory, and/or storage. Alternatively, one or more of the components of the device(s) 110, the system component(s) 120, or the skill support system(s) 125 may utilize the I/O interfaces (602/702), processor(s) (604/704), memory (606/706), and/or storage (608/708) of the device(s) 110 system component(s) 120, or the skill support system(s) 125, respectively. Thus, the ASR component 150 may have its own I/O interface(s), processor(s), memory, and/or storage; the NLU component 160 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system component(s) 120, and the skill support system(s) 125, as described herein, are illustrative, and may be located as a stand-alone device or may be included, in whole or in part, as a component of a larger device or system.

As illustrated in FIG. 8, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system component(s) 120, the skill support system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 150, the NLU component 160, etc. of one or more system components 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving first audio data representing a spoken input, the first audio data including a first audio frame corresponding to a first portion of the spoken input and a second audio frame corresponding to a second portion of the spoken input;
processing, using a gating component, the first audio frame to determine a first weight value indicative of a custom entity being represented in the first audio frame;
determining that the first weight value satisfies a condition;
in response to the first weight value satisfying the condition, processing the first audio frame using a joint network to determine a first token corresponding to the first portion of the spoken input;
processing, using the gating component, the second audio frame to determine a second weight value indicative of a custom entity being represented in the second audio frame;
determining that the second weight value fails to satisfy the condition;
in response to the second weight value failing to satisfy the condition, processing, using a biasing component, at least a first entity and the second audio frame to determine biased audio embedding data, wherein the at least the first entity is associated with user profile data of a user that provided the spoken input;
processing, using the joint network, the biased audio embedding data to determine a second token corresponding to the second portion of the spoken input;
determining automatic speech recognition (ASR) data representing the spoken input, the ASR data including at least the first token and the second token; and
determining, using the ASR data, output data responsive to the spoken input.

2. The computer-implemented method of claim 1, further comprising:
determining first audio embedding data corresponding to the first audio frame;
processing, using the biasing component, the at least the first entity and the first audio embedding data;
in response to the first weight value satisfying the condition, sending, by the gating component to the biasing component, an indicator representing entity biasing is not needed for the first audio frame; and
in response to receiving the indicator, ceasing processing by the biasing component of the at least the first entity and the first audio embedding data.

3. The computer-implemented method of claim 1, further comprising:
receiving a first plurality of entities associated with the user profile data;
determining entity embedding data corresponding to the first plurality of entities;
processing the entity embedding data to determine a vector of weight values including a first weight value indicating that the first entity of the first plurality of entities needs biasing information for ASR processing, the vector of weight values including a second weight value indicating that a second entity of the first plurality of entities does not need biasing information for ASR processing;
determining, using the entity embedding data and the vector of weight values, a second plurality of entities including the first entity and excluding the second entity; and
storing the second plurality of entities associated with the user profile data,
wherein processing using the biasing component further comprises processing the second plurality of entities and the second audio frame to determine the biased audio embedding data.

4. The computer-implemented method of claim 1, further comprising:
configuring the gating component and the joint network using training data, wherein the gating component is configured based at least in part on confidence scores determined by the joint network;
determining, using the gating component, the first weight value based on the joint network likely generating a first confidence score when processing the first audio frame; and
determining, using the gating component, the second weight value based on the joint network likely generating a second confidence score, lower than the first confidence score, when processing the second audio frame, wherein the first weight value is lower than the second weight value.

5. A computer-implemented method comprising:
receiving audio embedding data corresponding to a first portion of audio data;
determining the first portion of the audio data is likely to include an entity;
determining entity embedding data corresponding to at least a first entity;
based on determining the first portion of the audio data is likely to include the entity, determining, using the entity embedding data and the audio embedding data, a biasing value corresponding to the at least first entity;
determining weighted entity embedding data using the entity embedding data and the biasing value;
determining, using the first portion of the audio data and the weighted entity embedding data, a first portion of automatic speech recognition (ASR) data; and
determining, using the ASR data, output data responsive to the audio data.

6. The computer-implemented method of claim 5, further comprising:
determining a value representing a likelihood of the second portion including an entity; and
based on the second value, determining, using the second portion of the audio data, a second portion of the ASR data.

7. The computer-implemented method of claim 5, further comprising:

determining second entity embedding data corresponding to a set of entities associated with a user profile;

processing the second entity embedding data to determine a vector of weight values corresponding to the set of entities, wherein a first weight value of the vector corresponds to a second entity of the set;

determining that the first weight value satisfies a condition; and in response to the first weight value satisfying the condition, determining an updated set of entities excluding at least the second entity.

8. The computer-implemented method of claim 5, wherein the first value is determined using a gating component and the first portion of the ASR data is determined using a joint network, and the method further comprises:

training the gating component based at least in part on confidence scores determined by the joint network in processing training audio data, wherein the gating component is configured to output a second value when the joint network is capable of processing a second portion of the audio data with a first confidence score and a third value when the joint network is capable of processing a third portion of the audio data with a second confidence score lower than the first confidence score, wherein the second value is lower than the third value.

9. The computer-implemented method of claim 5, further comprising:

determining second audio embedding data corresponding to a second portion of the audio data;

determining second entity embedding data corresponding to a set of entities;

processing, using a biasing component, the second entity embedding data and the audio embedding data;

determining, using a gating component, a value representing a likelihood of the second portion of the audio data including an entity;

based on the second value, ceasing processing by the biasing component; and determining a second portion of the ASR data using the second audio embedding data.

10. The computer-implemented method of claim 5, further comprising:

determining the first portion of the ASR data using a model; and determining a second value corresponding to a second portion of the audio data, the second value being based on the model generating a confidence score when processing the second portion of the audio data, wherein the second value triggers use of entity biasing when processing the second portion of the audio data.

11. A system comprising:

at least one processor; and at least one memory including instructions that, when executed by the at least one processor, cause the system to:

receive audio embedding data corresponding to a first portion of audio data;

determine the first portion of the audio data is likely to include an entity;

determine entity embedding data corresponding to at least a first entity;

based on determining the first portion of the audio data is likely to include an entity, determine, using the entity embedding data and the audio embedding data, a biasing value corresponding to the at least first entity;

determine weighted entity embedding data using the entity embedding data and the biasing value;

determine, using the first portion of the audio data and the weighted entity embedding data, automatic speech recognition (ASR) data; and determine, using the ASR data, output data.

12. The system of claim 11, wherein the instructions that, when executed by the at least one processor, cause the system to:

determine a value representing a likelihood of the second portion including an entity; and based on the second value, determine, using the second portion of the audio data, a second portion of the ASR data.

13. The system of claim 11, wherein the instructions that, when executed by the at least one processor, further cause the system to:

determine second entity embedding data corresponding to a set of entities associated with a user profile;

process the second entity embedding data to determine a vector of weight values corresponding to the set of entities, wherein a first weight value of the vector corresponds to a second entity of the set;

determine that the first weight value satisfies a condition; and in response to the first weight value satisfying the condition, determine an updated set of entities excluding at least the second entity.

14. The system of claim 11, wherein the first value is determined using a gating component and the first portion of the ASR data is determined using a joint network, and wherein the instructions that, when executed by the at least one processor, further cause the system to:

train the gating component based at least in part on confidence scores determined by the joint network in processing training audio data, wherein the gating component is configured to output a second value when the joint network is capable of processing a second portion of the audio data with a first confidence score and a third value when the joint network is capable of processing a third portion of the audio data with a second confidence score lower than the first confidence score, wherein the second value is lower than the third value.

15. The system of claim 11, wherein the instructions that, when executed by the at least one processor, further cause the system to:

determine second audio embedding data corresponding to a second portion of the audio data;

determine second entity embedding data corresponding to a set of entities;

process, using a biasing component, the second entity embedding data and the audio embedding data;

determine, using a gating component, a value representing a likelihood of the second portion of the audio data including an entity;

based on the second value, cease processing by the biasing component; and determine a second portion of the ASR data using the second audio embedding data.

16. The system of claim 11, wherein the instructions that, when executed by the at least one processor, further cause the system to:

determine the first portion of the ASR data using a model; and determine a second value corresponding to a second portion of the audio data, the second value being based on the model generating a confidence score when processing the second portion of the audio data, wherein the second value triggers use of entity biasing when processing the second portion of the audio data.

\* \* \* \* \*